United States Patent
Kobori et al.

(10) Patent No.: US 10,222,512 B2
(45) Date of Patent: Mar. 5, 2019

(54) OPTICAL MEMBER HAVING LOW REFRACTIVE INDEX LAYER

(71) Applicant: SAMSUNG ELECTRONICS CO., LTD., Suwon-si (KR)

(72) Inventors: Shigeto Kobori, Yokohama (JP); Atsushi Sato, Yokohama (JP); Tomomichi Kanda, Yokohama (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 30 days.

(21) Appl. No.: 15/323,205

(22) PCT Filed: Jun. 30, 2015

(86) PCT No.: PCT/KR2015/006741
§ 371 (c)(1),
(2) Date: Dec. 30, 2016

(87) PCT Pub. No.: WO2016/003179
PCT Pub. Date: Jan. 7, 2016

(65) Prior Publication Data
US 2017/0131439 A1    May 11, 2017

(30) Foreign Application Priority Data

Jun. 30, 2014   (JP) .................................. 2014-135226
Oct. 29, 2014   (JP) .................................. 2014-220829
(Continued)

(51) Int. Cl.
*G02B 1/14* (2015.01)
*C08J 7/06* (2006.01)
(Continued)

(52) U.S. Cl.
CPC ................ *G02B 1/14* (2015.01); *C08J 7/06* (2013.01); *C08J 7/18* (2013.01); *G02B 1/11* (2013.01);
(Continued)

(58) Field of Classification Search
CPC ................ G02B 1/10; G02B 5/30; G02F 5/30
See application file for complete search history.

(56) References Cited

U.S. PATENT DOCUMENTS 6,343,865 B1   2/2002   Suzuki
7,037,573 B2   5/2006   Miyatake et al.
(Continued)

FOREIGN PATENT DOCUMENTS

CN   1934464 A     3/2007
CN   103534220 A   1/2014
(Continued)

OTHER PUBLICATIONS

Machine-generated English-language translation of JP2006336008A.*
(Continued)

*Primary Examiner* — Vu A Nguyen
(74) *Attorney, Agent, or Firm* — Sughrue Mion, PLLC

(57) ABSTRACT

Provided is a resin film, etc. not having the film strength thereof being easily degraded, even when an additive is used. Further, provided is a resin film, etc. having a lower reflectivity. A low refractive index layer (the resin film) comprises a binder. Further, the low refractive index layer comprises hollow particles distributed in the binder. Further, the low refractive index layer comprises a fluorine-containing polymer which is immiscible with the hollow particles. The fluorine-containing polymer which is immiscible with the hollow particles is mostly distributed on the surface of the low refractive index layer.

20 Claims, 15 Drawing Sheets

(30) Foreign Application Priority Data

| Oct. 29, 2014 | (JP) | 2014-220830 |
| Feb. 23, 2015 | (JP) | 2015-033160 |
| Feb. 23, 2015 | (JP) | 2015-033161 |
| Jun. 10, 2015 | (JP) | 2015-117333 |

(51) Int. Cl.

| C08J 7/18 | (2006.01) |
| G02B 1/11 | (2015.01) |
| G02B 1/118 | (2015.01) |
| G02B 5/02 | (2006.01) |
| G02F 1/1335 | (2006.01) |
| G02B 5/30 | (2006.01) |
| G02B 1/111 | (2015.01) |

(52) U.S. Cl.
CPC ............ G02B 1/118 (2013.01); G02B 5/0294 (2013.01); G02F 1/133502 (2013.01); *C08J 2301/12* (2013.01); *C08J 2333/12* (2013.01); *G02B 1/111* (2013.01); *G02B 5/0247* (2013.01); *G02B 5/30* (2013.01); *G02F 1/133528* (2013.01); *G02F 2201/50* (2013.01)

(56) References Cited

U.S. PATENT DOCUMENTS

| 7,161,743 | B2 | 1/2007 | Nishida et al. |
| 8,662,403 | B2 | 3/2014 | Kato et al. |
| 8,986,843 | B2 | 3/2015 | Horio et al. |
| 9,272,947 | B2 | 3/2016 | Baca et al. |
| 2007/0048513 | A1* | 3/2007 | Okamoto ............... G02B 1/111 428/313.3 |
| 2007/0206283 | A1 | 9/2007 | Ohtani et al. |
| 2007/0287009 | A1 | 12/2007 | Okude et al. |
| 2010/0067109 | A1* | 3/2010 | Horio ...................... G02B 1/111 359/485.01 |
| 2010/0079867 | A1* | 4/2010 | Wakizaka ............... G02B 1/111 359/586 |
| 2010/0118406 | A1 | 5/2010 | Kobori et al. |
| 2012/0281292 | A1 | 11/2012 | Baca et al. |
| 2014/0050909 | A1 | 2/2014 | Choi et al. |
| 2014/0195211 | A1 | 7/2014 | Ichikawa |

FOREIGN PATENT DOCUMENTS

| JP | 2003-344614 A | 12/2003 |
| JP | 2004-109966 A | 4/2004 |
| JP | 2006-35493 A | 2/2006 |
| JP | 2006-51781 A | 2/2006 |
| JP | 2006-159415 A | 6/2006 |
| JP | 2006-336008 A | 12/2006 |
| JP | 2007-86455 A | 4/2007 |
| JP | 2008-15527 A | 1/2008 |
| JP | 2010-85983 A | 4/2010 |
| JP | 2014-135339 A | 7/2014 |
| JP | 2014-220831 A | 11/2014 |
| KR | 10-0296369 B1 | 7/2001 |
| KR | 10-1411023 B1 | 6/2014 |
| KR | 10-2014-0140139 A | 12/2014 |
| WO | 2005/064367 A1 | 7/2005 |

OTHER PUBLICATIONS

International Search Report dated Sep. 17, 2015, issued by the International Searching Authority in counterpart International Patent Application No. PCT/KR2015/006741 (PCT/ISA/210).

Written Opinion dated Sep. 17, 2015, issued by the International Searching Authority in counterpart International Patent Application No. PCT/KR2015/006741 (PCT/ISA/237).

Communication dated Feb. 6, 2018, issued by the European Patent Office in counterpart European Patent Application No. 15814916.1.

Communication dated Jul. 26, 2018, issued by the State Intellectual Property Office of China in counterpart Chinese Application No. 201580035566.0.

\* cited by examiner

FIG. 9

| | | | HARD COAT LAYER | | | | | | EVALUATION RESULT | | | | |
|---|---|---|---|---|---|---|---|---|---|---|---|---|---|
| | TYPE | ATO | MONOMER | MONOMER COMPONENT | | SOLVENT COMPONENT | | PHOTOPOLY MERIZATION INITIATOR | SURFACE RESISTANCE (Ω/□) | PENCIL HARDNESS | REFRACTIVE INDEX | AMOUNT AT SURFACE (Vol%) | LAYER THICKNESS (μm) |
| | | | | A-TMMT | A-TMM-3 | DIACETONE ALCOHOL | 1,3-DIOXOLANE | IRGACURE 184 | | | | | |
| EXAMPLE A1-1 | DISPERSED | 10 | 90 | 50 | 50 | 40 | 60 | 5 | 1E+14 | H | 1.534 | 2.47 | 5 |
| EXAMPLE A1-2 | DISPERSED | 20 | 80 | 50 | 50 | 40 | 60 | 5 | 5.06E+11 | 2H | 1.545 | 5.34 | 5 |
| EXAMPLE A1-3 | DISPERSED | 30 | 70 | 50 | 50 | 40 | 60 | 5 | 7.68E+10 | 3H | 1.550 | 6.67 | 5 |
| EXAMPLE A2-1 | SURFACE | 10 | 90 | 99 | 1 | 5 | 95 | 5 | 5.55E+09 | 2H | 1.554 | 7.69 | 5 |
| EXAMPLE A2-2 | SURFACE | 15 | 85 | 99 | 1 | 5 | 95 | 5 | 9.89E+08 | 2H | 1.589 | 17.14 | 5 |
| EXAMPLE A2-3 | SURFACE | 20 | 80 | 99 | 1 | 5 | 95 | 5 | 6.19E+08 | 2H | 1.613 | 23.91 | 5 |
| EXAMPLE A2-4 | SURFACE | 10 | 90 | 95 | 5 | 5 | 95 | 5 | 7.38E+09 | 2H | 1.551 | 7.07 | 5 |
| EXAMPLE A2-5 | SURFACE | 10 | 90 | 90 | 10 | 5 | 95 | 5 | 2.34E+10 | 2H | 1.539 | 3.82 | 5 |
| EXAMPLE A2-6 | SURFACE | 10 | 90 | 99 | 1 | 10 | 90 | 5 | 7.03E+10 | 2H | 1.541 | 4.30 | 5 |
| EXAMPLE A2-7 | SURFACE | 10 | 90 | 99 | 1 | 1 | 99 | 5 | 3.87E+09 | 2H | 1.557 | 8.69 | 5 |
| EXAMPLE A3-1 | INTERFACE | 5 | 95 | 99 | 1 | 40 | 60 | 5 | 2.78E+09 | 2H | 1.533 | 2.26 | 5 |
| EXAMPLE A3-2 | INTERFACE | 7.5 | 92.5 | 99 | 1 | 40 | 60 | 5 | 9.14E+08 | 2H | 1.536 | 3.12 | 5 |
| EXAMPLE A3-3 | INTERFACE | 10 | 90 | 99 | 1 | 40 | 60 | 5 | 6.21E+08 | 2H | 1.537 | 3.35 | 5 |
| EXAMPLE A3-4 | INTERFACE | 10 | 90 | 99 | 1 | 25 | 75 | 5 | 1.46E+10 | 2H | 1.545 | 5.34 | 5 |
| EXAMPLE A3-5 | INTERFACE | 10 | 90 | 99 | 1 | 30 | 70 | 5 | 5.19E+08 | 2H | 1.537 | 3.35 | 5 |
| EXAMPLE A3-6 | INTERFACE | 10 | 90 | 95 | 5 | 40 | 60 | 5 | 6.98E+08 | 2H | 1.536 | 3.12 | 5 |
| EXAMPLE A3-7 | INTERFACE | 10 | 90 | 90 | 10 | 40 | 60 | 5 | 1.56E+10 | 2H | 1.538 | 6.17 | 5 |
| COMPARATIVE EXAMPLE A4-1 | DISPERSED | 10 | 90 | 0 | 100 | 40 | 60 | 5 | 1E+14 | F | 1.532 | 6.17 | 5 |
| COMPARATIVE EXAMPLE A4-2 | INTERFACE | 10 | 90 | 99 | 1 | 100 | 0 | 5 | | NOT EVALUATED | | | |
| COMPARATIVE EXAMPLE A4-3 | INTERFACE | 10 | 90 | 99 | 1 | 0 | 100 | 5 | | NOT EVALUATED | | | |

FIG. 11

| | ATO | MONOMER (A-TMMT) | MULTI BRANCHED MONOMER | SOLVENT COMPONENT (%) | | PHOTOPOLY MERIZATION INITIATOR | EVALUATION RESULT | | |
|---|---|---|---|---|---|---|---|---|---|
| | | | | DIACETONE ALCOHOL | 1,3-DIOXOLANE | IRGACURE 184 | SURFACE RESISTANCE (Ω/□) | MAXIMUM CONVEX-CONCAVE HEIGH DIFFERENCE (%) | TYPE |
| EXAMPLE B1 | 5 | 88 | 3 | 60 | 40 | 4 | 5.0E+09 | 0.09 | INTERFACE CONCENTRATED TYPE |
| EXAMPLE B2 | 10 | 83 | 3 | 60 | 40 | 4 | 1.0E+09 | 0.13 | INTERFACE CONCENTRATED TYPE |
| EXAMPLE B3 | 15 | 78 | 3 | 60 | 40 | 4 | 8.0E+08 | 0.17 | INTERFACE CONCENTRATED TYPE |
| EXAMPLE B4 | 15 | 71 | 10 | 60 | 40 | 4 | 7.0E+08 | 0.16 | INTERFACE CONCENTRATED TYPE |
| EXAMPLE B5 | 15 | 61 | 20 | 60 | 40 | 4 | 3.0E+09 | 0.35 | DISPERSION TYPE |
| EXAMPLE B6 | 15 | 80 | 1 | 60 | 40 | 4 | 7.0E+08 | 0.48 | INTERFACE CONCENTRATED TYPE |
| COMPARATIVE EXAMPLE B1 | 5 | 91 | 0 | 60 | 40 | 4 | 5.0E+09 | 0.42 | INTERFACE CONCENTRATED TYPE |
| COMPARATIVE EXAMPLE B2 | 10 | 86 | 0 | 60 | 40 | 4 | 1.0E+09 | 0.56 | INTERFACE CONCENTRATED TYPE |
| COMPARATIVE EXAMPLE B3 | 15 | 81 | 0 | 60 | 40 | 4 | 8.0E+08 | 0.65 | INTERFACE CONCENTRATED TYPE |

FIG. 13

| | SUBSTRATE | COMPONENT | | | | | | | | EVALUATION RESULT | | | | | | |
|---|---|---|---|---|---|---|---|---|---|---|---|---|---|---|---|---|
| | | HOLLOW SILICA PARTICLE | | | BINDER | | | | ADDITIVE | Y-VALUE | MinR | SW SCRATCH TEST | SURFACE MEAN ROUGHNESS (Ra) | MAXIMUM HEIGHT (Rmax) | 10-POINT AVERAGE ROUGHNESS (Rz) | CONVEX-CONCAVE AVERAGE DISTANCE (Sm) | AVERAGE THICKNESS |
| | | 60nm | 50nm | 70nm | PHOTOPOLYMERIZABLE FLUORINE-CONTAINING MONOMER | SILSESQUIOXANE | MODIFIED SILICONE COMPOUND | PHOTOPOLYMERIZATION INITIATOR | PHOTOPOLYMERIZABLE FLUORINE-CONTAINING POLYMER | (%) | (%) | (g) | (nm) | (nm) | (nm) | (nm) | (nm) |
| EXAMPLE C1 | PMMA | 63 | 3 | - | 24 | 6 | 1 | 3 | 5 | 0.14 | 0.07 | 2500K | 19.1 | 143 | 54 | 65 | 109 |
| EXAMPLE C2 | PMMA | 63 | 3 | - | 22 | 8 | 1 | 3 | 5 | 0.16 | 0.09 | 2500K | 16.2 | 135 | 46 | 42 | 111 |
| EXAMPLE C3 | PMMA | 63 | 3 | - | 20 | 10 | 1 | 3 | 5 | 0.18 | 0.11 | 2500K | 13.7 | 138 | 41 | 53 | 115 |
| EXAMPLE C4 | PMMA | 2.5 | - | 60.5 | 22 | 11 | 1 | 3 | 5 | 0.13 | 0.07 | 2500K | 18.6 | 145 | 57 | 71 | 108 |
| EXAMPLE C5 | PMMA | - | 2.5 | 60.5 | 22 | 11 | 1 | 3 | 5 | 0.145 | 0.09 | 2500K | 15.8 | 137 | 48 | 55 | 112 |
| EXAMPLE C6 | PMMA | - | - | 61 | 15 | 20 | 1 | 3 | 5 | 0.28 | 0.22 | 3000K | 10.6 | 126 | 36 | 59 | 117 |
| EXAMPLE C7 | TAC+HC | - | - | 61 | 15 | 20 | 1 | 3 | 5 | 0.28 | 0.17 | 3000K | 11.9 | 129 | 33 | 49 | 118 |
| COMPARATIVE EXAMPLE C1 | PMMA | 63 | 3 | - | 24 | 7 | - | 3 | 5 | 0.20 | 0.13 | 50NG | 17.1 | 142 | 43 | 56 | 110 |
| COMPARATIVE EXAMPLE C2 | PMMA | 63 | 3 | - | 22 | 9 | - | 3 | 5 | 0.21 | 0.15 | 50NG | 15.4 | 135 | 46 | 43 | 114 |
| COMPARATIVE EXAMPLE C3 | PMMA | 63 | 3 | - | 20 | 11 | - | 3 | 5 | 0.27 | 0.20 | 50NG | 11.8 | 128 | 38 | 64 | 121 |
| COMPARATIVE EXAMPLE C4 | PMMA | 2.5 | - | 60.5 | 22 | 12 | - | 3 | 5 | 0.21 | 0.14 | 50NG | 16.3 | 138 | 42 | 31 | 112 |
| COMPARATIVE EXAMPLE C5 | PMMA | - | 2.5 | 60.5 | 22 | 12 | - | 3 | 5 | 0.22 | 0.22 | 50NG | 11.0 | 119 | 32 | 58 | 119 |
| COMPARATIVE EXAMPLE C6 | PMMA | - | - | 61 | 15 | 21 | - | 3 | 5 | 0.28 | 0.22 | 50NG | 10.5 | 123 | 33 | 46 | 120 |
| COMPARATIVE EXAMPLE C7 | TAC+HC | - | - | 61 | 15 | 21 | 1 | 3 | 5 | 0.24 | 0.18 | 50NG | 11.6 | 131 | 38 | 47 | 116 |

FIG. 14

|  |  | EXAMPLE D1 | COMPARATIVE EXAMPLE D1 |
|---|---|---|---|
| OPTICAL PROPERTY | Y-VALUE (%) | 0.28 | 3.93 |
|  | MinR (%) | 0.17 | 3.83 |
|  | COLOR (a*, b*) | 4.1, −3.8 | 0.0, −0.5 |
| POLARIZING PLATE PERFORMANCE | LIGHT TRANSMITTANCE (%) | 44.0 | 42.5 |
|  | DEGREE OF POLARIZATION (%) | 99.996 | 99.995 | ns
OPTICAL MEMBER HAVING LOW REFRACTIVE INDEX LAYER

This application is a National stage entry of International Application No. PCT/KR2015/006741, filed on Jun. 30, 2015, which claims priority from Japanese Application No. 2014-135226 filed Jun. 30, 2014, Japanese Application No. 2014-220829 filed Oct. 29, 2014, Japanese Application No. 2014-220830 filed Oct. 29, 2014, Japanese Application No. 2015-033160 filed Feb. 23, 2015, Japanese Application No. 2015-033161 filed Feb. 23, 2015, and Japanese Application No. 2015-117333 filed Jun. 10, 2015. The disclosures of each of the applications are herein incorporated by reference in their entirety.

TECHNICAL FIELD

The present disclosure relates to an optical element having a low refractive layer.

BACKGROUND ART

For example, a display device including a liquid crystal panel may have a polarizing film at an outermost surface. A surface of the polarizing film may be, for example, formed of a triacetylcellulose (TAC) film. However, since the TAC is susceptible to being scratched, a hard coat layer may be arranged on the TAC so as to prevent the TAC from being scratched.

Here, as an ingredient for preventing scratches, metal oxide particles are generally contained in the hard coat layer. Also, in order to suppress charging of a polarizing film, a conducting material may be added to the metal oxide particles.

Also, it is preferable that the polarizing film has a capability to suppress reflection. In this regard, a low refractive layer for disturbing reflection of light incident from the outside may be disposed on the hard coat layer. Here, reflectance may be decreased when a binder formed of an incompatible resin is included in the low refractive layer such that a convex-concave structure is formed on a surface of the low refractive layer. Also, additives may be added to the low refractive layer to impart an antifouling property and a slippery property to the low refractive layer.

Patent Document 1 discloses an anti-reflection film. The anti-reflection film is directly formed on at least one surface of a transparent substrate film or with another layer therebetween, thereby forming an anti-reflection layer. The anti-reflection layer satisfies a refractive index: $ND^{20} \le 1.49$ and is formed of at least two low refractive index materials.

Also, Patent Document 2 discloses a curable resin composition. A multifunctional silane compound including a multifunctional (meth)acrylate is chemically bonded to a surface hydroxyl group of silica fine particles. An organic-inorganic hybrid hard coating solution including the organic-inorganic silica particles and an antistatic coating solution are mixed. The antistatic coating solution includes conductive metal oxide fine particles having a multifunctional (meth)acrylate chemically bonded to a surface thereof. Also, due to a self-organizing property of the two coating solutions, an antistatic property and an anti-glare property may both be realized in a single layer. Further, a phase-stabilizing agent is added to the antistatic anti-glare coating solution to control the self-organizing property of the antistatic anti-glare layer. Also, the convex-concave structure of the antistatic anti-glare layer is controlled to have a nano-scale size so as to lower a refractive index, and thus, a low-reflection function may be imparted to the layer.

Also, Patent Document 3 discloses an anti-reflection film having a sea-island structure formed by a phase not having silica particles and a phase having silica particles.

Also, Patent Document 4 discloses a hard coat film which has a hard coat layer disposed on a substrate. The hard coat layer includes an ionizing radiation-curable resin that has a multifunctional monomer having two or more (meth)acryloyl groups in one molecule as a main ingredient. An amount of the ionizing radiation-curable resin is in a range of 90 parts to 10 parts by weight. Also, the hard coat layer includes the conducting material at an amount in a range of 10 parts to 90 parts by weight. The conducting material in the hard coat layer is unevenly distributed with a greater concentration toward an upper surface of the hard coat layer. Also, the substrate is a triacetylcellulose film.

Also, in Patent Document 5, a hard coat film is disclosed having a hard coat layer. The hard coat layer includes an ionizing radiation-curable resin stacked on at least one surface of a substrate of the hard coat layer. The hard coat layer has 90 parts to 30 parts by weight of the ionizing radiation-curable resin and 10 parts to 70 parts by weight of a conducting material as main ingredients. The 90 parts to 30 parts by weight of the ionizing radiation-curable resin includes a multifunctional monomer containing two or more (meth)acryloyl groups in one molecule as a main ingredient. Also, a refractive index difference between the substrate and the hard coat layer is in a range of 0.01 to 0.1. The hard coat layer is formed by using a coating solution including at least one solvent that dissolves or swells the substrate and a solvent which stably disperses a conducting material.

Also, in Patent Document 6, a stack that includes a hard coat layer and an anti-reflection layer including an inorganic oxide stacked in the stated order. The hard coat layer includes an ionizing radiation-curable resin compound having an ionizing radiation-curable resin and a conducting material as main ingredients. The ionizing radiation-curable resin includes a multifunctional monomer containing two or more (meth)acryloyl groups in one molecule on at least one surface of a substrate as a main ingredient. The ionizing radiation-curable resin includes a multifunctional monomer that contains at least one —OH group in one molecule. In one embodiment, the ionizing radiation-curable resin has a refractive index difference between the substrate and the hard coat layer in a range of 0.01 to 0.1. In one embodiment, the hard coat layer is formed by using a coating solution including a solvent of at least one type that dissolves or swells the substrate and a solvent which stably disperses a conducting material.

PATENT DOCUMENTS

Patent Document 1: JP 2004-109966A
Patent Document 2: JP 2008-015527A
Patent Document 3: JP 2006-336008A
Patent Document 4: JP 2006-159415A
Patent Document 5: JP 2006-051781A
Patent Document 6: JP 2006-035493A

DETAILED DESCRIPTION OF THE INVENTION

Technical Problem

However, when additives are added in the formation of a low refractive layer, the additives may, in some cases, lower a cross-linking density of a binder. Thereby, strength of the low refractive layer may deteriorate. Also, a conventional low-refractive index layer has reflectance that is not sufficiently low. Therefore, in the present disclosure, provided is a resin film (a low refractive layer) having strength that does not easily deteriorate even when the additives are used. Also, provided is the resin film having low reflectance.

Technical Solution

According to an aspect of an embodiment, an optical element includes a substrate; and a low refractive layer formed on the substrate, wherein the low refractive layer includes a resin layer that has a first surface and a second surface opposite to the first surface, the first surface is a convex-concave surface, and the second surface is located adjacent to the substrate, and the resin layer includes a first binder; hollow particles distributed in the first binder; and a fluorine-containing polymer immiscible with the hollow particles.

In some embodiments, a concentration of the modified silicone compound at the convex-concave surface may be higher than a concentration of the modified silicone compound at a central part, in a thickness direction, of the resin layer.

In some embodiments, the hollow particles may be hollow silica particles.

In some embodiments, the hollow particles may have a plurality of relative maximum points in a frequency-particle diameter curve which exhibits particle diameter distribution of the hollow particles.

In some embodiments, the hollow particles may have a photopolymerizable functional group and a hydroxyl group on a surface thereof, a median particle diameter of the hollow particles may be in a range of about 10 nm to about 100 nm, and a refractive index of the hollow particles themselves may be in a range of about 1.10 to about 1.40.

In some embodiments, the fluorine-containing polymer immiscible with the hollow particles may be a polymer of a monomer represented by Formula (6):

  (6)

wherein, in Formula (6), $Rf^1$ represents a (per)fluoroalkyl group or a (per)fluoro polyether group; $W^1$ represents a linking group; $RA^1$ represents a functional group having a polymerizable unsaturated group; n is 1, 2, or 3; and m is 1, 2, or 3.

In some embodiments, the first binder may be a polymer formed of a photopolymerizable fluorine-containing monomer represented by Formulae (4) and (5):

  (4)

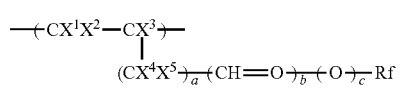  (5)

wherein, in Formula (4), M is a structural unit derived from a fluorine-containing ethylene monomer represented by Formula (5), and A is a structural unit derived from a monomer which is co-polymerizable with the fluorine-containing ethylene monomer represented by Formula (5);

in Formula (5), $X^1$ and $X^2$ are H or F; $X^3$ is H, F, $CH_3$, or $CF_3$; $X^4$ and $X^5$ are H, F, or $CF_3$; at least one of $X^1$, $X^2$, and $X^3$ includes fluorine; Rf is an organic group having 1 to 3 $Y^1$ groups which are attached to a C1-C40 fluorine-containing alkyl group or a C2-C100 fluorine-containing alkyl group having an ether bond, wherein $Y^1$ is a C2-C10 monovalent organic group having an ethylene carbon-carbon double bond at an end thereof; a is 0, 1, 2, or 3; and b and c are 0 or 1;

the polymer includes M at an amount in a range of about 0.1 mol % or higher to about 100 mol % or lower; and A at an amount in a range of about 0 mol % or higher to about 99.9 mol %, and a number average molecular weight of the polymer is in a range of about 30,000 to about 1,000,000.

In some embodiments, the first binder may further include silsesquioxane.

In some embodiments, the resin layer may further include a modified silicone compound, and a concentration of the modified silicone compound at the convex-concave surface may be higher than a concentration of the modified silicone compound at a central part, in a thickness direction, of the resin layer.

In some embodiments, the optical element may further include a hard coat layer located between the substrate and the low refractive layer, the hard coat layer including a second binder that is a polymer of a monomer having a photopolymerizable functional group, and metal oxide particles distributed in the second binder.

In some embodiments, the monomer having a photopolymerizable functional group may include a first monomer represented by Formula (7) and a second monomer represented by Formula (8):

  (7)

  (8)

wherein, in Formulae (7) and (8), $R^1$ to $R^4$ each represent a photopolymerizable functional group that does not include a hydroxyl group, and $R^5$ in Formula (8) represents a functional group having a hydroxyl group at an end thereof.

In some embodiments, the second binder may include a photopolymerization product formed by photopolymerizing: at least one selected from a multibranched oligomer having a photopolymerizable functional group and a multibranched monomer having a photopolymerizable functional group; and the monomer having a photopolymerizable functional group.

In some embodiments, the metal oxide particles may include a tin oxide and a conducting material added to the tin oxide.

In some embodiments, the metal oxide particles may be unevenly distributed in the second binder with a greater concentration toward the second binder's surface portion adjacent to the substrate.

In some embodiments, the low refractive layer may have a maximum thickness of about 200 nm, an average thickness in a range of about 90 nm to about 130 nm, an average surface roughness (Ra) in a range of about 10 nm to about 20 nm, a maximum height (Rmax) in a range of about 60 nm to about 150 nm, a 10-point average roughness (Rz) in a range of about 20 nm to about 60 nm, an average convex-concave distance (Sm) in a range of about 20 nm to about 80 nm, and visible light reflectance of about 0.3% or lower.

In some embodiments, the substrate may be a polarizing means.

According to another aspect of an embodiment, an image display device includes an image display means; and the optical element disposed on a surface of the image display means.

Advantageous Effects of the Invention

According to one or more embodiments, provided is a resin film having strength that does not easily deteriorate even when additives are contained therein. Also, provided is the resin film having a low refractive index and low reflectance.

DESCRIPTION OF THE DRAWINGS

FIG. 9 is a view that illustrates Examples and Comparative Examples;

FIG. 11 is a view that illustrates Examples and Comparative Examples;

FIG. 13 is a view that illustrates Examples and Comparative Examples; and

FIG. 14 is a view that illustrates the results of evaluation of a polarizing film.

BEST MODE

Figure 1A:
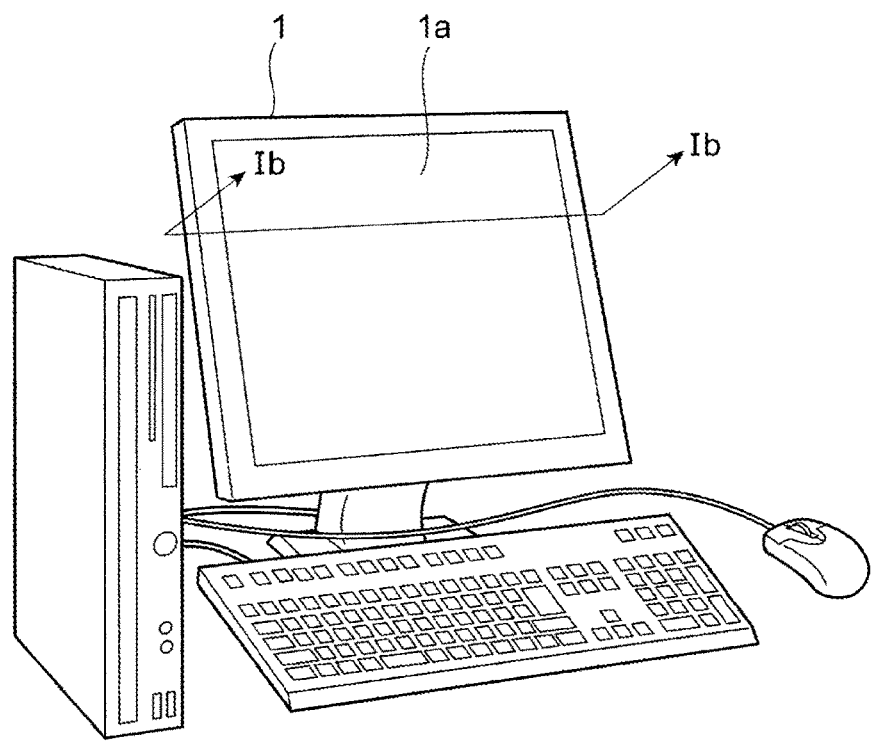
FIG. 1A is a view that illustrates an example of a display device according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

<Description of Display Apparatus>

FIG. 1A is a view that illustrates a display apparatus 1 according to an embodiment.

Non-limiting examples of the display apparatus 1 may include display apparatuses such as a liquid crystal display (LCD), a plasma display panel (PDP), a cathode ray tube (CRT) display, and an electroluminescent (EL) display. Also, non-limiting examples of the display apparatus 1 may include large-sized display apparatuses such as a TV, a monitor, and a billboard. In addition, non-limiting examples of the display apparatus 1 may include small-sized display apparatuses for a mobile device such as a navigator for vehicles, a portable game device, or a mobile phone. The display apparatus 1 displays an image on a display screen 1a.

<Description of Liquid Crystal Panel>

Figure 1B:
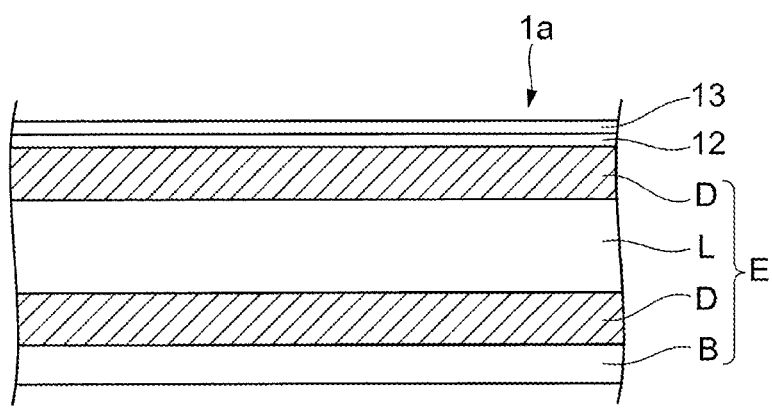
FIG. 1B is a cross-sectional view, taken along line Ib-Ib of FIG. 1A, which exhibits an example of a structure of a display screen according to an embodiment.

FIG. 1B is a cross-sectional view, taken along line Ib-Ib of FIG. 1A, which illustrates an example of a structure of a display screen 1a according to an embodiment.

The display screen 1a includes a liquid crystal panel E, which is an example of a display means, and a hard coat layer 12 and a low refractive layer (a resin layer) 13 formed on a surface of the liquid crystal panel E.

As shown in the drawing, the liquid crystal panel E includes a liquid crystal L; polarizing films D disposed on an upper surface and a lower surface of the liquid crystal L; and a backlight B disposed under the lower polarizing film D.

The upper and lower polarizing films D are examples of a polarizing means that polarizes light, and directions of light being polarized by the upper and lower polarizing films D may be perpendicular to each other. For example, the polarizing films D may include a resin film including molecules of an iodine compound in a polyvinyl alcohol (PVA). Also, the resin film is inserted between, and is bonded to, two resin films formed of triacetylcellulose (TAC). Light is polarized by the molecules of an iodine compound included in the polarizing films D. Also, the backlight B may be, for example, a cold cathode fluorescent lamp or a white light-emitting diode (LED).

A power source not shown in the drawings is connected to the liquid crystal L, and when a voltage is applied by the power source, an arrangement direction of the liquid crystal L changes. Also, when light is irradiated from the backlight B, light is first transmitted through the lower polarizing film D, and thus light is polarized. When the liquid crystal panel E is a TN-type liquid crystal panel, the polarized light is transmitted through the liquid crystal panel E while the voltage is applied to the liquid crystal panel E. Also, the upper polarizing film D has a different polarizing direction and thus blocks the polarized light. A polarizing direction of the polarized light rotates 90° according to a function of the liquid crystal panel E when a voltage is not applied to the liquid crystal panel E. In this regard, the upper polarizing film D does not block the polarized light and transmits the polarized light. Thus, an image may be displayed according to whether a voltage is applied to the liquid crystal panel E or not. Also, although not shown, a color image may be displayed by using a color filter. Here, the polarizing film D with the hard coat layer 12 and the low refractive layer 13 disposed thereover is an example of a polarizing element.

Figure 1C:
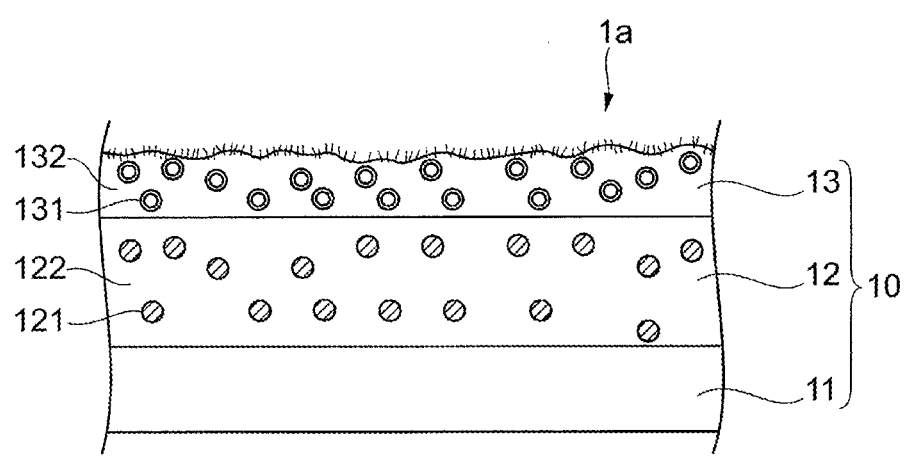
FIG. 1C is an enlarged view of FIG. 1B, the enlarged view showing the outermost part of the display screen.

FIG. 1C is an enlarged view of FIG. 1B and illustrates the outermost part of the display screen 1a.

Here, the substrate 11, the hard coat layer 12, and the low refractive layer 13 are shown. The substrate 11 is the outermost layer of the polarizing film D. Also, the substrate 11, the hard coat layer 12, and the low refractive layer 13 may be used as a protection film 10. When the substrate 11, the hard coat layer 12, and the low refractive layer 13 are used as the protection film 10, the protection film 10 protects the polarizing film D. Also, the protection film 10 is an example of an optical element according to an embodiment.

The substrate 11 may be a transparent substrate having total luminous transmittance of 85% or higher. The substrate 11 may be, for example, TAC as described above. Also, embodiments are not limited thereto, and the substrate 11 may be polyethylene terephthalate (PET). However, according to an embodiment, the substrate 11 may preferably be TAC. The substrate 11 may have a thickness, for example, in a range of about 20 μm or greater to about 200 μm or less.

The hard coat layer 12 is a functional layer for preventing scratches on the substrate 11. The hard coat layer 12 has a structure that contains metal oxide particles 121 in a binder 122 (a second binder) as a base material, wherein the binder 122 has a resin as a main component. The metal oxide particles 121 are, for example, fine particles having a weight average particle diameter in a range of about 1 nm or greater to about 15 nm or less. Also, when the particles are contained in the binder, a hard coat property may be imparted to the hard coat layer 12. In some embodiments, examples of the metal oxide particles 121 may include tin oxide, titanium oxide, or cerium oxide.

Also, it may be preferable if the hard coat layer 12 further includes an antistatic function. When the hard coat layer 12 includes an antistatic function, dust in the air may not attach well to the hard coat layer 12, and dirt may not easily accumulate on the hard coat layer 12 when the display apparatus 1 is used. Also, dust in the air may not easily attach to the hard coat layer 12 when the hard coat layer 12 is formed on the substrate 11. Thereby, the hard coat layer 12 may be formed easily, and the yield may easily improve during the formation of the hard coat layer 12.

Therefore, the hard coat layer 12 according to an embodiment has a conducting material added to the metal oxide particles 121. In this case, the conducting material may be, for example, a metal element. In particular, examples of the conducting material include antimony (Sb) and phosphorus (P). Also, the conducting material is not limited to one type of material and at least two types of material may be included therein. In this case, a surface resistance value of the hard coat layer 12 decreases and an antistatic function may be imparted to the hard coat layer 12.

Here, a tin oxide with antimony (Sb) added may preferably be used as the metal oxide particles 121 with the conducting material added. This is also referred to as an antimony-doped tin oxide or antimony tin oxide (ATO). The hard coat layer 12 according to an embodiment may have a thickness, for example, in a range of about 1 μm or greater to about 10 μm or less.

A weight ratio of the binder 122 to the metal oxide particles 121 may be preferably in a range of, for example, about 5 wt %:95 wt % or greater to about 30 wt %:70 wt % or less.

Figure 2A:
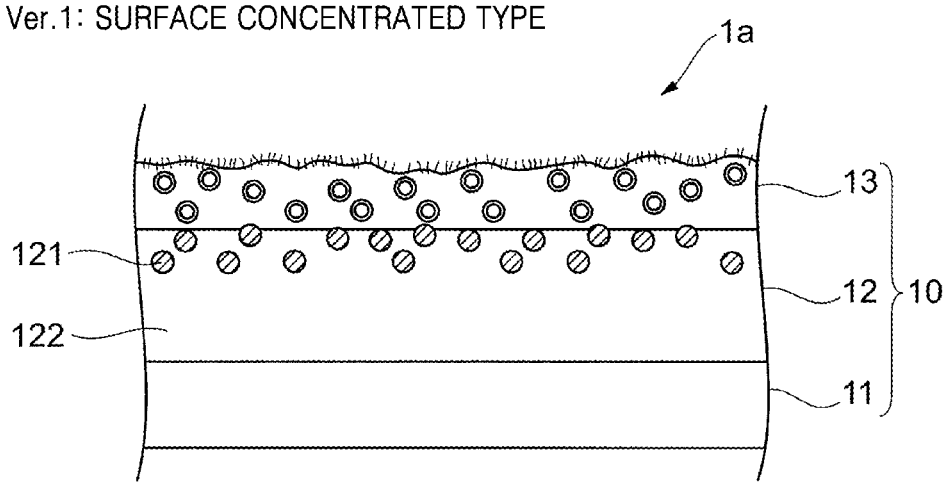
FIGS. 2A to 2C are views of a structure of a hard coat layer according to an embodiment.
Figure 2B:
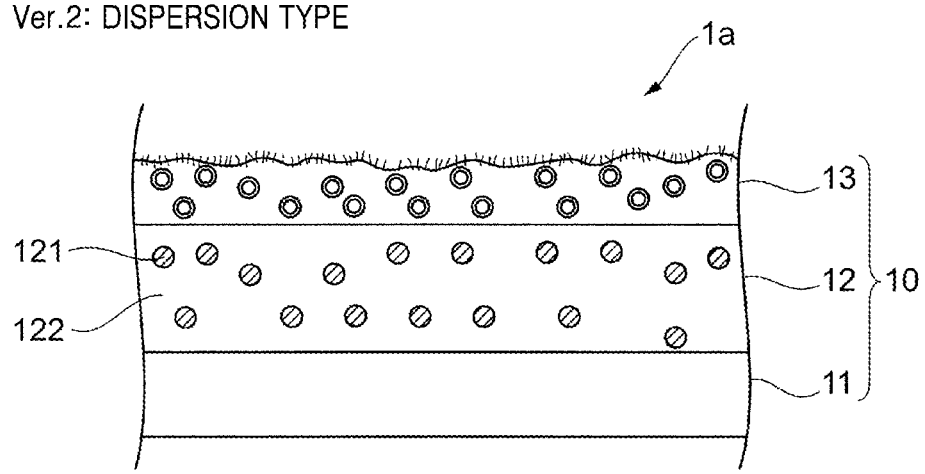
Figure 2C:
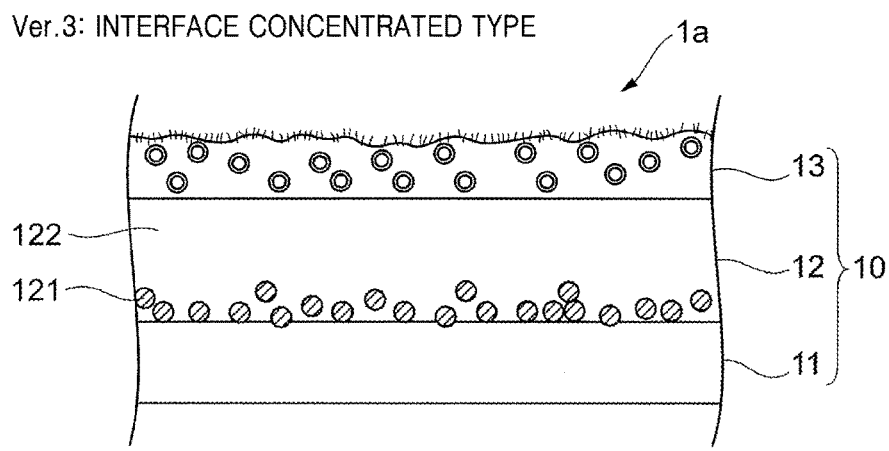

FIGS. 2A to 2C are views that illustrate a structure of the hard coat layer 12 according to an embodiment.

The hard coat layer 12 according to an embodiment may be classified into three types shown in FIGS. 2A to 2C.

Regarding FIG. 2A among these, a type represented by "Ver.1" has the metal oxide particles 121 unevenly distributed with a greater concentration toward a surface portion (e.g., a portion adjacent to a low refractive layer 13) of the hard coat layer 12. In FIG. 2A, this is shown as "a surface-concentrated type". That is, the metal oxide particles 121 exist in the hard coat layer 12 with a greater concentration toward the surface portion than toward a portion adjacent to the substrate 11. On the other hand, the binder 122, which is another main component of the hard coat layer 12, exists in the hard coat layer 12 at a greater concentration toward the portion adjacent to the substrate 11 than toward the surface portion.

In the Ver.1 type, the following effects may be produced due to the metal oxide particles 121 unevenly distributed in the binder 122 with a greater concentration toward the surface portion. First, convex-concave structures may be formed by the metal oxide particles 121 at an interface between the hard coat layer 12 and the low refractive layer 13, and thus a surface area of hard coat layer 12 may increase. In this regard, a binding property of hard coat layer 12 to the low refractive layer 13 improves. Also, since the metal oxide particles 121 are distributed at a greater concentration toward the surface portion, hardness at the interface between the hard coat layer 12 and the low refractive layer 13 improves. In this regard, overall hardness of the hard coat layer 12 increases, and thus the hard coat layer 12 may have excellent properties. Also, when the conducting material is added to the metal oxide particles 121, a surface resistance value decreases. That is, an antistatic effect increases.

Also, a refractive index of the hard coat layer 12 increases, and a difference between the refractive indexes of the hard coat layer 12 and the low refractive layer 13 having a low refractive index further increases. In this regard, an effect of suppressing external light reflection at the low refractive layer 13 increases. Also, in the case where a transparent electrode formed of an indium tin oxide (ITO) is used in the liquid crystal panel E, a pattern of the electrode may not be easily seen to the user.

Also, in FIG. 2B, a type represented by "Ver.2" has the metal oxide particles 121 evenly distributed in the hard coat layer 12. In FIG. 2B, this is shown as "a dispersion type". That is, the metal oxide particles 121 are not unevenly distributed in the hard coat layer 12 with a greater concentration toward the surface portion or toward the portion adjacent to the substrate 11. This may also imply that the distributions of the metal oxide particles 121 in an upper direction and a lower direction have no deviation.

In the Ver.2 type, the metal oxide particles 121 are evenly distributed in the hard coat layer 12. Therefore, when a monomer described later in the specification is hardened to form the binder 122, differential shrinkage may not easily occur in a vertical direction. Also, hardness and flexibility of the hard coat layer 12 may be achieved at the same time.

Also, in FIG. 2C, a type represented by "Ver.3" has the metal oxide particles 121 unevenly distributed in the binder 122 with a greater concentration toward a portion adjacent to the substrate 11. In FIG. 2C, this is shown as "an interface-concentrated type". That is, the metal oxide particles 121 exist in the hard coat layer 12 with a greater concentration toward the portion adjacent to the substrate 11 than toward the surface portion (e.g., the portion adjacent to the low refractive layer 13). On the other hand, the binder 122, which is another main component of the hard coat layer 12, exists in the hard coat layer 12 at a greater concentration toward the surface portion than toward the portion adjacent to the substrate 11.

In the Ver.3 type, the following effects may be produced due to the metal oxide particles 121 unevenly distributed with a greater concentration toward the portion adjacent to the substrate 11. First, since the binder 122 exists at a greater concentration toward the surface portion, a recoating property (reactivity) between the low refractive layer 13 and the binder 12 may improve. Also, since the metal oxide particles 121 are distributed at a greater concentration toward the portion adjacent to the substrate 11, hardness at the interface between the hard coat layer 12 and the substrate 11 improves. In this regard, overall hardness of the hard coat layer 12 increases, and thus the hard coat layer 12 may become an excellent hard coat layer. Also, when the conducting material is added to the metal oxide particles 121, a surface resistance value decreases. That is, an antistatic effect increases.

The low refractive layer 13 is a functional layer for suppressing reflection of external light incident on the low refractive layer 13.

Hereinafter, a structure of the low refractive layer 13 will be described.

Figure 3:
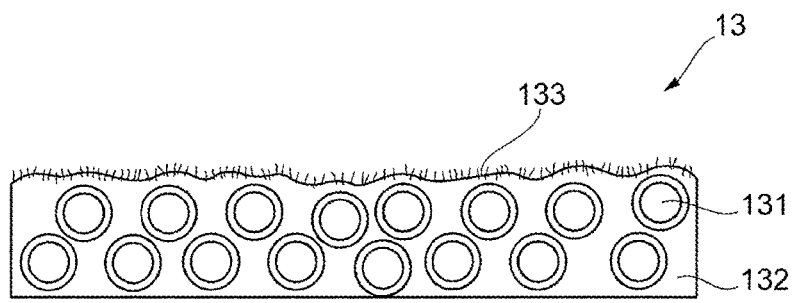
FIG. 3 is a view that illustrates a low refractive layer in detail.

FIG. 3 is a view that describes the low refractive layer 13 in detail. The low refractive layer 13 is a resin layer 13 that has a first surface and a second surface, wherein the first and second surfaces are opposite to each other. The first surface (an upper surface) is a concave-convex surface, and the second surface (a lower surface) is located at a side toward a substrate (not shown). The resin layer 13 includes a first binder 132; hollow particles 131 distributed in the first binder 132; and a fluorine-containing polymer 133 that is immiscible with the hollow particles 131. The fluorine-containing polymer 133 that is immiscible with the hollow particles 131 moves toward a surface (i.e., the concave-convex surface) of the resin layer (13) due to a bleeding-out phenomenon during a process of coating a coating solution for forming the low refractive layer 13. Accordingly, a concentration of the fluorine-containing polymer 133 at the concave-convex surface is higher than a concentration of the fluorine-containing polymer 133 at the central part in a thickness direction of the resin layer 13. In this regard, the concave-convex surface of the resin layer 13 may primarily include the fluorine-containing polymer 133. In other words, a fluorine polymer layer 133 in the form of a film that primarily includes the fluorine-containing polymer 133 is formed on the concave-convex surface of the resin layer 13. Here, once aspect that should be noted is that since the fluorine-containing layer 133 is formed by the bleeding-out phenomenon, a fine convex-concave structure of the concave-convex surface of the resin layer 13 is not damaged even when the fluorine polymer layer 133 is formed. If the uneven surface of the resin layer 13 is coated with a separate coating solution including a fluorine-containing polymer, the fine convex-concave structure of the uneven surface of the resin layer 13 would be filled up.

The hollow particles 131 may be, for example, hollow silica particles, hollow alumina particles, hollow resin particles, or any combination thereof. For example, the hollow particles 131 may have a plurality of relative maximum points in a frequency-particle diameter curve which exhibits particle diameter distribution of the hollow particles 131. For example, the hollow particles 131 may have a photopolymerizable functional group and a hydroxyl group on a surface thereof, a median particle diameter in a range of about 10 nm to about 100 nm, and a refractive index in a range of about 1.10 to about 1.40. In some embodiments, the hollow particles 131 may be hollow silica particles. In this case, the low refractive layer 13 has a structure in which the hollow silica particles 131 are distributed in the binder 132 (a first binder) having a resin as a main ingredient. Also, the low refractive layer 13 has the fluorine polymer layer 133 at the surface portion (e.g., an upper surface portion in the drawing).

The low refractive layer 13 may have a low refractive index by including the hollow silica particles 131, and thus reflection of external light may be suppressed. The refractive index of the low refractive layer 13 may be, for example, 1.50 or lower. For example, the low refractive layer 13 according to an embodiment may have a thickness in a range of about 100 nm to about 150 nm.

The hollow silica particles 131 have a shell layer, and an inside of the shell layer may be hollow or may be formed of a porous body. The shell layer or porous body is mainly formed of silicon oxide ($SiO_2$). Also, a plurality of photopolymerizable functional groups and hydroxyl groups are bonded to a surface portion of the shell layer. The photopolymerizable functional groups and the shell layer are bonded via at least one bond selected from a Si—O—Si bond and a hydrogen bond. Examples of the photopolymerizable functional group may include an acryloyl group and a methacryloyl group. That is, the hollow silica particles 131 may include at least one selected from an acryloyl group and a methacryloyl group as the photopolymerizable functional group. The photopolymerizable functional group is also referred to as an ionizing radiation-curable group. The hollow silica particles 131 may have at least one photopolymerizable functional group, and the number and the type of such functional groups are not particularly limited.

A median particle diameter ($D_{50}$) of the hollow silica particles 131 may preferably be in a range of about 10 nm or greater to about 100 nm or less. More preferably, the median particle diameter ($D_{50}$) of the hollow silica particle 131 may be preferably in a range of about 40 nm or greater to about 75 nm or less. When the median particle diameter ($D_{50}$) of the hollow silica particle 131 is less than about 10 nm, an effect of decreasing the refractive index of the low refractive layer 13 may not occur. Also, when the median particle diameter ($D_{50}$) of the hollow silica particle 131 is greater than about 100 nm, transparency of the low refractive layer 13 may degrade.

A median particle diameter of the hollow silica particles 131 is a median value of particle diameters of the hollow silica particles 131. When the hollow silica particles 131 are assumed to have the shape of a sphere, each of the particle diameters are a diameter of a sphere. For example, a particle diameter of the hollow silica particles 131 may be measured by using a laser diffraction/scattering particle size distribution analyzer. The laser diffraction/scattering particle size distribution analyzer may be, for example, LA-920 (available from Horiba, Ltd.), but not limited thereto. Also, a refractive index of the hollow silica particles 131 changes according to a refractive index required for the low refractive layer 13. The refractive index of the hollow silica particles 131 may be, for example, in a range of about 1.10 or higher to about 1.40 or lower, or, for example, preferably, in a range of about 1.15 or higher to about 1.25 or lower. For example, the refractive index of the hollow silica particles 131 may be measured by using simulation software. Examples of the simulation software include TracePro™ available from Lamda Research Optics. Inc.

Also, the hollow silica particles 131 preferably have a plurality of relative maximum points in a frequency-particle diameter curve (a particle diameter distribution curve) which exhibits particle diameter distribution of the hollow silica particles 131. That is, the hollow silica particles 131 comprise two or more sets of particles with the sets having a particle size distribution different from each other.

Figure 4:
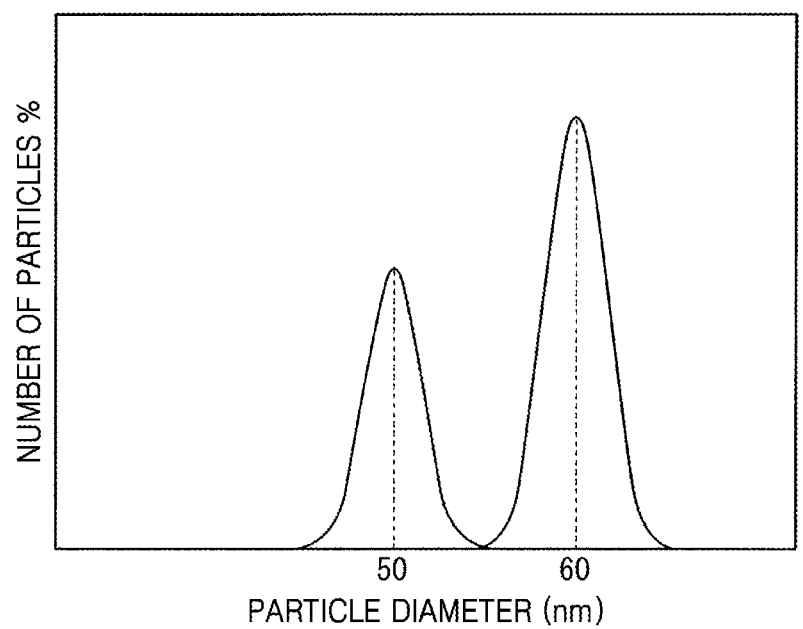
FIG. 4 is a graph that illustrates a particle diameter distribution curve of hollow silica particles according to another embodiment.

FIG. 4 is a graph that illustrates a particle size distribution curve of the hollow silica particles 131 according to an embodiment. In FIG. 4, horizontal axis represents particle diameters of the hollow silica particles 131, and the vertical axis represents frequency distribution corresponding to particle diameters in number %.

As shown in FIG. 4, the hollow silica particles 131 have two relative maximum points at median particle diameters of 50 nm and 60 nm. This may be achieved by mixing hollow silica particles having a median particle diameter of 50 nm and hollow silica particles having a median particle diameter of 60 nm.

In this regard, a surface area of the hollow silica particles 131 is increased by mixing hollow silica particles having different median particle diameters. Thus, strength of the low refractive layer 13 may be improved.

An amount of the hollow silica particles 131 may be in a range of about 40 wt % or higher to about 70 wt % or lower when the total amount of the hollow silica particles 131 and the binder 132 is 100 wt %. When the amount of the hollow silica particles 131 is within this range, a convex-concave structure is formed on a surface of the low refractive layer 13. The convex-concave structure has a mean surface roughness (Ra) in a range of about 10 nm or greater to about 20 nm or less. The hollow silica particles 131 decrease a refractive index of the low refractive layer 13. In this regard, when the amount of the hollow silica particles 131 is lower than 40 wt %, the refractive index of the low refractive layer 13 does not decrease sufficiently. More preferably, the amount of the hollow silica particles 131 may be in a range of about 50 wt % or higher to about 65 wt % or lower.

Also, a mean particle diameter of the hollow silica particles 131 is not limited to the description provided above. For example, when hollow silica particles having a mean particle diameter of 75 nm are prepared, then either hollow silica particles having a mean particle diameter of 60 nm or hollow silica particles having a mean particle diameter of 50 nm may be combined with the hollow silica particles having a mean particle diameter of 75 nm. Also, all of the hollow silica particles having mean particle diameters of 50 nm, 60 nm, and 75 nm may be combined.

Surulia 2320 (available from Nikki Shokubai Kasei Co., Ltd.) may be used as the hollow silica particles having a median particle diameter of 50 nm. Also, Surulia 4320 (available from Nikki Shokubai Kasei Co., Ltd.) may be used as the hollow silica particles having a median particle diameter of 60 nm. Also, Surulia 5320 (available from Nikki Shokubai Kasei Co., Ltd.) may be used as the hollow silica particles having a median particle diameter of 75 nm.

The binder 132 has a network structure which connects the hollow silica particles 131 to each other. The binder 132 includes a photocurable fluorine-containing resin. The photocurable fluorine-containing resin is prepared by photopolymerizing a photopolymerizable fluorine-containing monomer represented by Formulae (4) and (5). Also, the binder 132 includes a structural unit M in an amount in a range of about 0.1 mol % or higher to about 100 mol % or lower. Also, the binder 132 includes a structural unit A at an amount in a range of higher than about 0 mol % to about 99.9 mol % or lower. Also, a number average molecular weight of the binder 132 is in a range of about 30,000 or greater to about 1,000,000 or less.

(4)

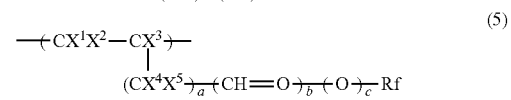

(5)

In Formula (4), M is a structural unit derived from a fluorine-containing ethylene monomer represented by Formula (5). Also, A is a structural unit derived from a monomer co-polymerizable with a fluorine-containing ethylene monomer represented by Formula (5). Non-limiting examples of the structural unit A include ethyleneglycoldi(meth)acrylate, neopentylglycoldi(meth)acrylate, 1,6-hexanediol(meth)acrylate, trimethylolpropanetri(meth)acrylate, dipentaerythritolhexa(meth)acrylate, polyolpoly(meth)acrylate, di(meth)acrylate of bisphenol A-diglycidylether, a polyvalent carboxylic acid and its anhydride, urethane(meth) acrylate, 2-hydroxyethyl(meth)acrylate, 2-hydroxypropyl(meth)acrylate, pentaerythritoltri(meth)acrylate, 2,3-dihydroxypropyl (meth)acrylate, 4-hydroxymethylcyclohexyl(meth)acrylate, ethyleneglycoldi(meth)acrylate, diethyleneglycoldi(meth)acrylate, triethyleneglycoldi(meth)acrylate, 1,4-butanedioldi(meth)acrylate, 1,6-hexanedioldi(meth)acrylate, neopentyldi(meth)acrylate, pentaerythritoldi(meth)acrylate, pentaerythritoltri(meth)acrylate, dipentaerythritoldi(meth) acrylate, dipentaerythritoltri(meth)acrylate, dipentaerythritolpenta(meth)acrylate, pentaerythritolhexa(meth)acrylate, dipentaerythritolhexa(meth)acrylate, bisphenol-A di(meth)acrylate, trimethylolpropanetri(meth)acrylate, novolakepoxy(meth)acrylate, propyleneglycoldi(meth)acrylate, 1,4-butanedioldi(meth)acrylate, 1,6-hexanedioldi(meth)acrylate, and a combination thereof.

In Formula (5), $X^1$ and $X^2$ are H or F. Also, $X^3$ is H, F, $CH_3$, or $CF_3$. $X^4$ and $X^5$ are H, F, or $CF_3$. Rf is an organic group having 1 to 3 $Y^1$ groups bonded to a C1-C40 fluorine-containing alkyl group or a C2-C100 fluorine-containing alkyl group having an ether bond. Also, $Y^1$ is a C2-C10 monovalent organic group having an ethylene carbon-carbon double bond at an end thereof. Also, a is 0, 1, 2, or 3, and b and c are 0 or 1.

The photopolymerizable fluorine-containing monomer may be, for example, Optool AR-110 available from Daikin Industries, Ltd.

Also, the binder 132 includes a silsesquioxane. A silsesquioxane is a siloxane-based compound having a main chain backbone composed of a Si—O bond which may be represented by a formula of $(RSiO_{1.5})n$. This indicates that a silsesquioxane is a siloxane having 1.5 oxygen atoms (1.5=sesqui) in the unit formula and is also known as "sil-sesqui-oxane". A siloxane compound may include a polysiloxane which is a typical organic silicon polymer, and this compound is also known as silicone (having a unit formula of $R_2SiO$). Also, silica (having a unit formula of $SiO_2$), which is an inorganic compound, is also a typical compound composed of a siloxane bond. As it may be known by comparing the formulae, silsesquioxane may be considered as a material between silicone and silica.

A silsesquioxane has a number of binding groups and binds with a photocurable fluorine-containing resin or the hollow silica particles 131 around the silsesquioxane. That is, when the binder 132 includes a silsesquioxane, strength of the low refractive layer 13 improves. In this regard, even when the photopolymerizable fluorine-containing polymer is added as an additive, the strength does not easily deteriorate.

An amount of silsesquioxane may be preferably about 5.0 wt % or higher. This is the amount obtained when the total amount of components included in the hollow silica particles 131 and the binder 132 is 100 wt %.

The silsesquioxane may be, for example, AC-SQ available from Toa Gosei Co. Also, AC-SQ SI-20 or MAC-SQ HDM available from Toa Gosei Co. may be used.

The silsesquioxane may have a structure selected from various backbone structures such as a random structure, a complete cage structure, a ladder structure, and an incomplete cage structure shown below. In the present embodiment, a complete cage structure and an incomplete cage structure may preferably be used among the structures listed above. Also, in particular, the silsesquioxane having a complete cage structure may be more preferably used. That is, the structure of $(RSiO_{1.5})n$ is 3-dimensional rather than 2-dimensional. Also, the structure has no opening, and the 3-dimensional structure itself forms a closed structure. Also, a silicon-structure or a perfluoro alkyl structure may be included in the 3-dimensional structure. When the silsesquioxane has this structure, a content ratio of silicon (or perfluoro alkyl)/silsesquioxane may preferably be 0.3 or less. This is because a strength of silsesquioxane may not be maintained when the content ratio is greater than 0.3.

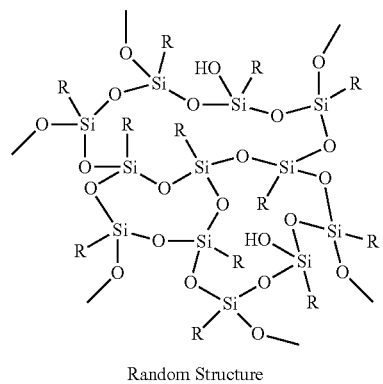

Random Structure

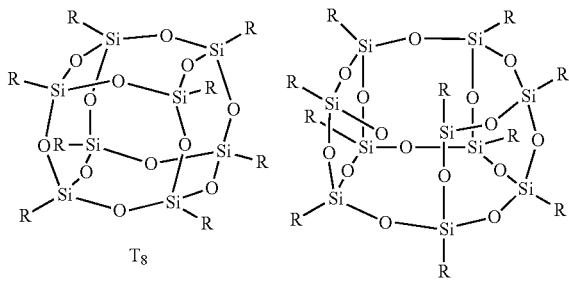

Complete Cage Structure

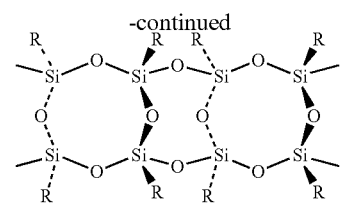

Ladder Structure

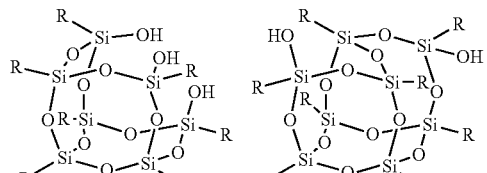

Incomplete Cage Structure

The fluorine polymer layer 133 includes a fluorine polymer. The fluorine polymer is prepared by photopolymerizing a photopolymerizable fluorine-containing polymer represented by Formula (6) shown below. The fluorine polymer is an additive which imparts an antifouling property and a slippery property to the low refractive layer 13.

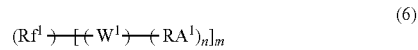

(6)

In Formula (6), $Rf^1$ represents a (per)fluoro alkyl group or a (per)fluoro polyether group. $W^1$ represents a linking group. $RA^1$ represents a functional group having a polymerizable unsaturated group. Also, n is an integer of 1 to 3. Also, m is an integer of 1 to 3. Also, $RA^1$ at the end serves as a photopolymerizable functional group.

A structure of the (per)fluoro alkyl group is not particularly limited. The (per)fluoro alkyl group may be, for example, linear (for example, $-CF_2CF_3$, $-CH_2(CF_2)_4H$, $-CH_2(CF_2)_8CF_3$, or $-CH_2CH_2(CF_2)_4H$). Also, the (per)fluoro alkyl group may have, for example, a branched structure (for example, $CH(CF_3)_2$, $CH_2CF(CF_3)_2$, $CH(CH_3)CF_2CF_3$, or $CH(CH_3)(CF_2)_5CF_2H$). Also, the (per)fluoro alkyl group may have, for example, an alicyclic structure. The alicyclic structure may be, for example, 5-membered or 6-membered. Also, the alicyclic structure may include a perfluoro cyclohexyl group, a perfluoro cyclopentyl group, or an alkyl group substituted with an alicyclic group selected therefrom.

The (per)fluoro polyether group is a (per)fluoro alkyl group having an ether bond, and the structure is not particularly limited. That is, the (per)fluoro polyether group may be, for example, $-CH_2OCH_2CF_2CF_3$ or $-CH_2CH_2OCH_2C_4F_8H$. Also, the (per)fluoro polyether group may be, for example, $-CH_2CH_2OCH_2CH_2C_8F_{17}$ or $-CH_2CH_2OCF_2CF_2OCF_2CF_2H$. Also, the (per)fluoro polyether group may be a C4-C20 fluorocycloalkyl group having at least 5 fluorine atoms. Also, the (per)fluoro polyether group may be, for example, $-(CF_2)_xO(CF_2CF_2O)_y$, $-[CF(CF_3)CF_2O]_x-CF_2(CF_3)]$, $-(CF_2CF_2CF_2O)_x$, or $-(CF_2CF_2O)_x$. Here, each of X and Y is a natural number.

The linking group is not particularly limited. Examples of the linking group include a methylene group, a phenylene group, an alkylene group, an arylene group, and a heteroalkylene group. Also, the linking group may be a combination of these groups. Also, the linking group may have a functional group such as a carbonyl group, a carbonyloxy group, a carbonylimino group, a sulfonamide group, or a combination thereof. Examples of the photopolymerizable functional group include an acryloyl group and a methacryloyl group.

A weight average molecular weight (Mw) of the photopolymerizable fluorine-containing polymer is preferably less than 10,000. Also, a lower limit of the weight average molecular weight (Mw) of the photopolymerizable fluorine-containing polymer is, for example, 3000 or greater, but the lower limit is not limited thereto. Also, an oleic acid sliding angle of the photopolymerizable fluorine-containing polymer is selected according to an antifouling property and a slippery property required for the low refractive layer 13. The oleic acid sliding angle may be, for example, 10° or less. The oleic acid sliding angle is measured by using, for example, a fully-automated contact angle meter DM700 (available from Kyowa Interface Science Co., Ltd.).

The photopolymerizable fluorine-containing polymer is preferable to have an increased molecular weight since its surface tension decreases as the weight average molecular weight (Mw) increases. That is, an antifouling property, a slippery property, and a bleed-out property improve. However, polarities of an acryloyl group and a methacryloyl group are high. In this regard, when a weight average molecular weight (Mw) of the fluorine polymer is too high, the functional group may not be introduced to the fluorine polymer. That is, the photopolymerizable fluorine-containing polymer may not be prepared. Also, when a weight average molecular weight (Mw) of the photopolymerizable fluorine-containing polymer is too high, the polymer may not dissolve in a solvent during preparation of the low refractive layer 13. In particular, its miscibility with the photopolymerizable fluorine-containing monomer decreases.

Therefore, the weight average molecular weight (Mw) of the photopolymerizable fluorine-containing polymer may be selected as described above. Thereby, the weight average molecular weight (Mw) of the photopolymeric fluorine-containing polymer to which an acryloyl group and a methacryloyl group are to be introduced may be lowered. Thus, an acryloyl group and a methacryloyl group may be easily introduced to the fluorine-polymer.

In the low refractive layer 13, an amount of the photopolymerizable fluorine-containing polymer is in a range of about 1.5 wt % or higher to about 7 wt % or lower. This is based on when the total amount of the hollow silica particles 131 and the photocurable fluorine-containing resin is 100 wt %. Also, the amount of the photopolymerizable fluorine-containing polymer is preferably in a range of about 2.0 wt % or higher to about 5.0 wt % or lower. When the photopolymerizable fluorine-containing polymer is not included as an additive, a fine sea-island structure having a surface mean roughness (Ra) in a range of about 10 nm or greater to about 20 nm or less may not be formed.

The hollow silica particles 131 have a hydroxyl group on surfaces thereof. In this regard, the hollow silica particles 131 may not be completely mixed with the photocurable fluorine-containing monomer. Also, the silica particles 131 have a photopolymerizable functional group on surfaces thereof. In this regard, the hollow silica particles 131 are polymerized with the photopolymerizable fluorine-containing monomer.

In this regard, the low refractive layer 13 having a complex 3-dimensional structure (a network structure) is formed, and a fine sea-island structure is formed. Also, the silsesquioxane facilitates the bleeding-out of the photopolymerizable fluorine-containing polymer having a relatively low surface tension. Thereby, the amount of the photopolymerizable fluorine-containing polymer which remains within the binder 132 may be lowered. Thus, a cross-linking density of the binder 132 improves, and a strength of the binder 132 improves. Also, the hollow silica particles 131 may directly bind to each other. That is, the photopolymerizable functional group of one of the hollow silica particles 131 binds to a photopolymerizable functional group of another hollow silica particle 131.

An amount of the photocurable fluorine-containing resin is in a range of about 15 wt % or higher to about 60 wt % or lower. This is based on when the total amount of the hollow silica particles 131 and the binder 132 is 100 wt %. When the amount of the photocurable fluorine-containing resin is within this range, the sea-island structure described above is formed. That is, in particular, when a coating solution is dried as will be described later, the hollow silica particles 131 and the photocurable fluorine-containing resin interact. Also, the hollow silica particles 131 agglomerate, and a sea-island structure is formed accordingly. When the amount of the photocurable fluorine-containing resin is outside of the range of 15 wt % or higher to 60 wt % or lower, the hollow silica particles 131 do not agglomerate, which makes it difficult to form a sea-island structure.

Also, the photocurable fluorine-containing resin is immiscible with the hollow silica particles 131. Thus, the photocurable fluorine-containing resin and the hollow silica particles 131 cause a fine sea-island structure to be formed. When an amount of the photocurable fluorine-containing resin is lower than 15 wt %, a fine sea-island structure may not be formed. The amount is preferably in a range of about 15 wt % or higher to about 45 wt % or lower.

Also, the photopolymerizable fluorine-containing polymer has a fluorine polymer moiety as a basic skeleton. In this regard, the fluorine polymer moiety and a hydrogen-bond forming group of the binder 132 repulse each other. Accordingly, the photopolymerizable fluorine-containing polymer effectively bleeds out. That is, the photopolymerizable fluorine-containing polymer is more concentrated in a surface of the low refractive layer 13. That is, the photopolymerizable fluorine-containing polymer is mainly distributed in a surface portion of the low refractive layer 13. Therefore, a fluorine polymer layer 133 as a protective layer formed of the photopolymerizable fluorine-containing polymer is formed on the surface of the low refractive layer 13.

Also, the photopolymerizable fluorine-containing polymer binds with the hollow silica particles 131 distributed in the surface of the low refractive layer 13 and the binder 132. This occurs when two photopolymerizable functional groups of the former and the latters bind to each other. Also, the photopolymerizable fluorine-containing polymer forms the fluorine polymer layer 133. The hollow silica particles 131 and the binder 132 located in the surface of the low refractive layer 13 may be protected by the fluorine polymer layer 133.

The photopolymerizable fluorine-containing polymer may be, for example, KY-1203 available from Shin-Etsu Chemical Co., Ltd.

Also, the fluorine polymer layer 133 includes a modified silicone compound. The modified silicone compound has a high molecular weight and is immiscible with the binder 132. In this regard, the modified silicone compound may bleed out together with the photopolymerizable fluorine-containing polymer and may be more concentrated in the surface of the low refractive layer 13. That is, the modified silicone compound is mainly distributed in the surface portion of the low refractive layer 13.

Here, in the modified silicone compound according to an embodiment a methyl group of a linear dimethylpolysiloxane represented by Formula (0) is substituted with another organic group. Also, n0 is an integer. That is, the modified silicone compound may be also referred to as an organic modified linear dimethylpolysiloxane.

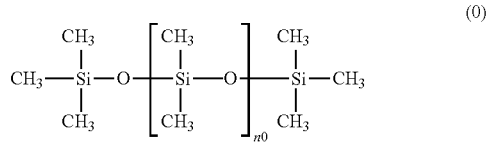
(0)

Also, in particular, the modified silicone compound used in the present embodiment may preferably be one selected from Formulae (1) to (3).

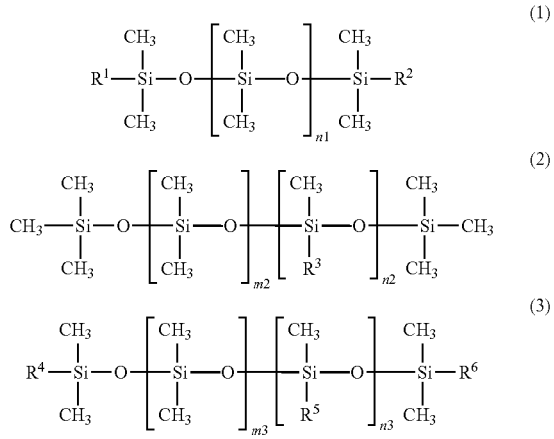

In Formulae (1) to (3), each of $R^1$ to $R^6$ is an organic group that has at least one selected from the following functional groups at an end thereof: an amino group (—$NH_2$), a hydroxyl group (—OH), an isocyanate group (—N=C=O), a vinyl group (—CH=$CH_2$), a mercapto group (—SH), a glycidoxy group, an acryloyl group (—CO—CH=$CH_2$), and a methacryloyl group (—CO—C($CH_3$)=$CH_2$). Also, either $R^4$ or $R^6$ in some embodiments may further include a methyl group. Also, each of m2, m3, n1, n2, and n3 is an integer.

Also, a linking group that is connected to the functional group, among the organic groups $R^1$ to $R^6$, which becomes the end group, is, for example, an alkyl chain.

In the modified silicone compound represented by Formula (1), methyl groups at both ends have been substituted with organic groups, and thus, the modified silicone compound represented by Formula (1) may be referred to as "a both-end type".

Also, in the modified silicone compound represented by Formula (2), a methyl group in a side chain has been substituted with the organic group, and thus, the modified silicone compound represented by Formula (2) may be referred to as "a side-chain type".

Also, in the modified silicone compound represented by Formula (3), methyl groups at both ends and in the side chain have been substituted with an organic group. However, in this case, at least one of the methyl groups at both ends may be essentially substituted with an organic group. That is, either $R^4$ or $R^6$ at the ends may be a methyl group. Here, the modified silicone compound may be referred to as "an end+side chain type".

The functional group at the end may preferably be an acryloyl group or a methacryloyl group. An acryloyl group and a methacryloyl group are photopolymerizable functional groups. Therefore, an acryloyl group and a methacryloyl group may photopolymerize with the photopolymerizable fluorine-containing polymer, and thus, strength of the fluorine polymer layer 133 improves. As a result, strength of the outermost surface of the low refractive layer 13, and strength of the whole of the low refractive layer 13 improves. Also, when a functional group at an end is not an acryloyl group or a methacryloyl group, heat may be applied thereto to perform polymerization.

Examples of the modified silicone compound that may preferably be used in the present embodiment may include those listed in Formula (2'). This is a side-chain type that belongs to Formula (2). Also, a methyl group of the side chain is substituted with a group having an acryloyl group at the end. That is, the modified silicone compound is an acryl-modified silicon. Also, the modified silicone compound may be referred to as an acryl-modified linear dimethyl polysiloxane. Also, a linking group connected to the acryloyl group at an end has an alkylene group bonded to an oxygen atom. A zigzag binding line represents an alkyl chain.

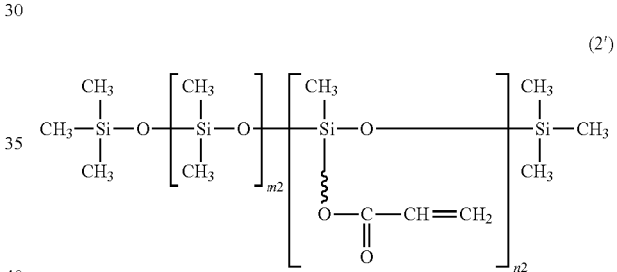
(2')

The modified silicone compound being used in the present embodiment may preferably have a weight average molecular weight in a range of about 15,000 g/mol or higher to about 50,000 g/mol or lower. When the molecular weight of the modified silicone compound is within this range, the modified silicone compound may be more easily concentrated in a surface of the low refractive layer 13.

Also, an amount of the modified silicone compound may be preferably in a range of about 0.5 wt % or higher to about 3.0 wt % or lower. Values of this range are based on when the total amount of all components included in the hollow silica particles 131 and the binder 132 is 100 wt %. When the amount of the modified silicone compound is lower than 0.5 wt %, strength of the low refractive layer 13 may not be improved. Also, when the amount of the modified silicone compound is higher than 3.0 wt %, a haze value that represents turbidity of the low refractive layer 13 may easily increase.

Also, in Formulae (2) and (3), each of n2 and n3 is preferably 6 or higher to 10 or lower. When n2 and n3 are within this range, strength of the fluorine polymer layer 133 may easily improve.

The modified silicone compound may be, for example, Tego Rad 2700 available from Evonik Industries AG. Also, Tego Rad 2650 available from the same company may be used.

Also, during the formation of the low refractive layer 13 according to an embodiment, a photopolymerization initiator for initiating photopolymerization may be used. Materials for the photopolymerization initiator are not particularly limited. However, materials that are not easily inhibited by oxygen and have a good surface curing property are preferable. In particular, Irgacure 907 available from BASF SE may be used.

The low refractive layer 13 described above may also have the following characteristics.

That is, first, the low refractive layer 13 has particles having a hollow shape and a resin component as main components. The particles having a hollow shape may be, for example, the hollow silica particles 131. Also, the particles may be, for example, alumina hollow particles or resin hollow particles. The resin component may be, for example, the binder 132 including the components described above. However, a conventional binder which satisfies the following conditions, may be used according to its intended use.

One of the conditions is that a maximum thickness of the low refractive layer 13 is 200 nm. When the thickness of the layer is greater than 200 nm, the visible light anti-reflection property may easily degrade. Also, an average thickness of the low refractive layer 13 needs to be in a range of about 90 nm or greater to about 130 nm or less. When an average thickness is less than 90 nm or greater than 130 nm, the visible light anti-reflection property may easily degrade. Also, a surface mean roughness (Ra) needs to be in a range of 10 nm or greater to 20 or less. When the surface mean roughness (Ra) is less than 10 nm, the visible light anti-reflection property may easily degrade. When the surface mean roughness (Ra) is greater than 20 nm, scratch resistance may easily degrade. Also, a maximum height (Rmax) of the low refractive layer 13 needs to be in a range of 60 nm or greater to 150 nm or less. When the maximum height (Rmax) is less than 60 nm or greater than 150 nm, the visible light anti-reflection property may easily degrade. Also, a 10-point average roughness (Rz) of the low refractive layer 13 needs to be in a range of 20 nm or greater to 60 nm or less. When the 10-point average roughness (Rz) of the low refractive layer 13 is less than 20 nm, the visible light anti-reflection property may easily degrade. When the 10-point average roughness (Rz) of the low refractive layer 13 is greater than 60 nm, scratch resistance may easily degrade. Also, an average convex-concave distance (Sm) of the low refractive layer 13 needs to be in a range of 20 nm or greater to 80 nm or less. When the average convex-concave distance (Sm) of the low refractive layer 13 is less than 20 nm or greater than 80 nm, the visible light anti-reflection property may easily deteriorate. Also, the visible light reflectance of the low refractive layer needs to be 0.3% or less.

Also, the 10-point average roughness (Rz) may be obtained by:

(i) extracting a part of a roughness curve which corresponds to a standard length in an average line direction from the roughness curve;

(ii) obtaining an average value of absolute values of height (Yp) of the first to fifth highest tips from the average line of the extracted part;

(iii) obtaining an average value of absolute values of depth (Yv) of the first to fifth lowest valleys; and (iv) taking a sum of the average value of (ii) and the average value of (iii), which is the 10-point average roughness (Rz).

<Description of Method of Forming Hard Coat Layer>

In the present embodiment, distribution in the hard coat layer 12 of the metal oxide particles 121 may be controlled according to Ver.1 to Ver.3 shown in FIG. 2A to 2C.

Hereinafter, a method of forming the hard coat layer 12 to implement the present embodiment will be described.

The method of forming the hard coat layer 12 according to an embodiment includes a process of coating a coating solution for forming the hard coat layer 12 on the substrate 11. Here, the coating solution includes the metal oxide particles 121, a monomer (or an oligomer) that constitutes the binder 122, a photopolymerization initiator, and a solvent that disperses these.

The monomer (or the oligomer) that constitutes the binder 122 does so by polymerization after coating of the coating solution.

In the present embodiment, a first monomer represented by Formula (7) and a second monomer represented by Formula (8) are mixed to be used as monomers that constitute the binder 122.

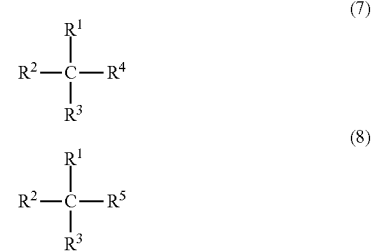

Also, in Formulae (7) and (8), each of $R^1$ to $R^4$ is a photopolymerizable functional group that does not include a hydroxyl group. Also, in Formula (8), $R^5$ is a functional group having a hydroxyl group at an end thereof.

In particular, each of $R^1$ to $R^4$ is a functional group having a double bond at the end. Examples of each of $R^1$ to $R^4$ may include a functional group having an acryloyl group and a methacryloyl group at the end. The first monomer may be, for example, penta(meth)acrylate or a pentaerythritol(meth)acrylate derivative.

Also, $R^5$ may be a simple hydroxyl group or a functional group such as —$CH_2OH$ or —$C_2H_5OH$. The second monomer may be, for example, tri(meth)acrylate. Also, the second monomer may be a trierythritol(meth)acrylate derivative.

A pentaerythritol tetraacrylate may preferably be used as the first monomer. The chemical formula thereof is C—($CH_2OOC$—CH=$CH_2$)$_4$. Also, pentaerythritol triacrylate may preferably be used as the second monomer. The chemical formula thereof is $HOCH_2$—C—($CH_2OOC$—CH=$CH_2$)$_3$.

Also, in the present embodiment, a multibranched monomer having a photopolymerizable functional group and/or a multibranched oligomer having a photopolymerizable functional group may be further used.

Figure 5:
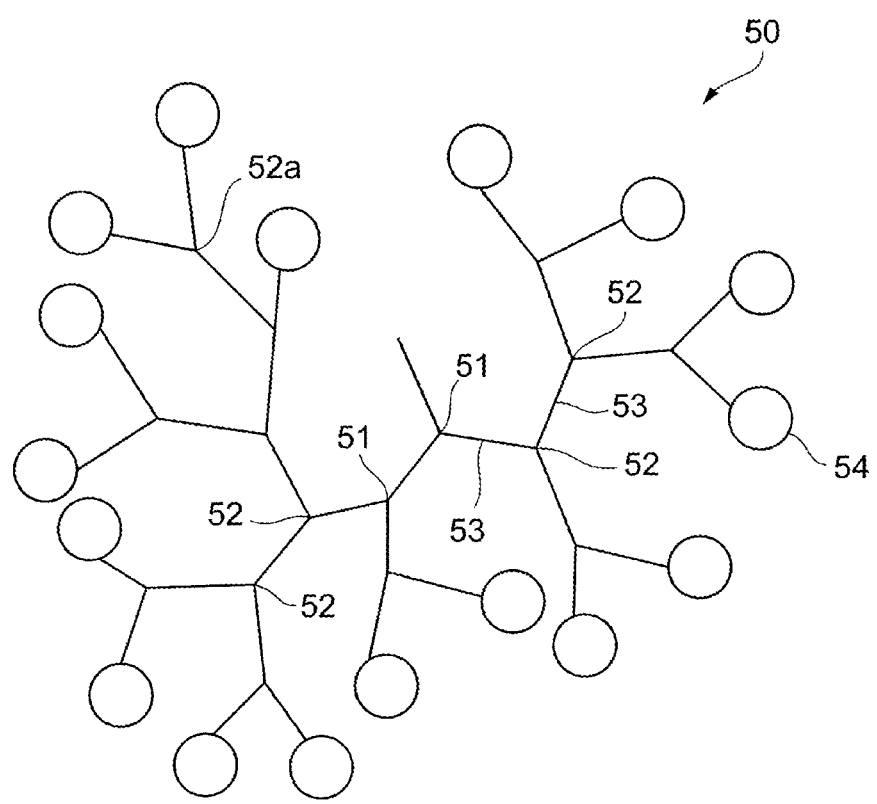
FIG. 5 is a view that illustrates a structure of a multi-branched monomer having a photopolymerizable functional group.

FIG. 5 is a view that illustrates a structure of a multibranched monomer having a photopolymerizable functional group.

FIG. 5 shows a configuration of a multibranched monomer 50 as the multibranched monomer having a photopolymerizable functional group. The multibranched monomer 50 is also referred to as hyper-branched or dendritic. The multibranched monomer 50 has a core part 51; a plurality of branch points 52; a plurality of branch parts 53; and a plurality of photopolymerizable functional groups 54. The core part 51 is a center of the multibranched monomer 50. Also, the core part 51 binds to at least one branch part 53. The core part 51 may be formed of a single element or may be formed of an organic group. The single element may be a carbon atom, a nitrogen atom, a silicon atom, or a phosphorus atom. Also, the organic group may be an organic group formed of various aliphatic moieties or cyclic moieties. Also, the core part 51 may exist as a plurality of core parts.

The branch point 52 is a starting point of the branch part 53, and at least three branch parts 53 grow from one branch point 52. The branch point 52 may be connected to the core part 51 or another branch point 52 through the branch part 53. The branch point 52 has the same structure as that of the core part 51. That is, the branch point 52 may be formed of a single element or may be formed of an organic group. Also, the branch points 52 are sequentially referred to as a first generation, a second generation, and so on from one that is closest to the core part 51. That is, the branch point 52 in direct connection with the core part 51 is the first generation, and the branch point 52 in connection with the branch point 52 of the first generation is the second generation.

The multibranched monomer having a photopolymerizable functional group used in the present embodiment has branches of at least two generations. For examples, in FIG. 5, the multibranched monomer 50 has a branch point 52a, which is the branch point 52 of a fourth generation.

The branch part 53 connects the core part 51 and the branch point 52 of the first generation. Also, the branch part 53 connects the branch point 52 of a k generation (where k is an integer of 1 or greater) and the branch point 52 of a (k+1) generation. The branch part 53 is a means of binding the core part 51 or the branch point 52.

The photopolymerizable functional group 54 is a functional group having a double bond at an end as described above. For example, the photopolymerizable functional group 54 may include a functional group having an acryloyl group or a methacryloyl group at the end. The multibranched monomer 50 is preferably bonded to the photopolymerizable functional group 54 at the branch point 52 of the second generation or a higher generation.

The multibranched monomer 50 may be, for example, polyester-based, polyamide-based, or polyurethane-based. Also, other various types of the multibranched monomer 50 may be used, such as a polyether-based, polyethersulfone-based, polycarbonate-based, or polyalkylamine-based multibranched monomer. The multibranched monomer 50 may also include, for example, a tadpole-shaped dendrimer, a comet-shaped dendrimer, a twin-type dendrimer, or a cylindrical dendrimer.

Also, the multibranched oligomer having a photopolymerizable functional group is prepared by polymerizing a multibranched monomer 50 having the photopolymerizable functional group 54.

The solvent includes a mixed solvent prepared by water and one selected from a group of solvents having a boiling point of 120° C. or higher (a high-boiling point solvent) at a free ratio. Also, the solvent includes one selected from a group of solvents that have a boiling point of, for example, 90° C. or lower and which dissolve triacetylcellulose (a low-boiling point solvent). That is, the solvent is prepared by mixing two different solvents. In particular, the high-boiling point solvent may be diacetone alcohol, ethyleneglycol monobutylether, or ethyleneglycol monoethylether. Diacetone alcohol (having a boiling point of 168° C.) may be more preferably used. Also, methylethylketone (MEK), methylacetic acid, dimethyl carbonic acid, or 1,3-dioxolane may be used as the low-boiling point solvent. 1,3-dioxolane (having a boiling point of 76° C.) may be more preferably used.

In the present embodiment, a mixing ratio of the first monomer and the second monomer and a mixing ratio of the high-boiling point solvent and the low-boiling point solvent are controlled. Also, in this regard, distribution in the hard coat layer 12 of the metal oxide particles 121 may be controlled. That is, the hard coat layer 12 of Ver.1 to Ver.3 shown in FIGS. 2A to 2C may be selectively prepared.

In particular, when the first monomer and the second monomer are mixed at a weight ratio of 99:1 or greater to 90:10 or less, the metal oxide particles 121 may be unevenly distributed with a greater concentration in one portion. That is, the hard coat layer 12 of Ver.1 or Ver. 3 may be prepared. Also, when the high-boiling point solvent and the low-boiling point solvent are mixed at a weight ratio in a range of 1:99 to 10:90, the metal oxide particles 121 are unevenly distributed with a greater concentration in the surface portion. That is, the hard coat layer 12 of Ver.1 may be prepared. Also, when the high-boiling point solvent and the low-boiling point solvent are mixed at a weight ratio in a range of 25:75 to 40:60, the metal oxide particles 121 are unevenly distributed with a greater concentration in the surface portion adjacent to the substrate 11. That is, the hard coat layer 12 of Ver.3 may be prepared.

When the first monomer and the second monomer are mixed at a weight ratio of 90:10 or greater to 1:99 or less, the metal oxide particles 121 may be evenly distributed. That is, the hard coat layer 12 of Ver.2 may be prepared. Also, the hard coat layer 12 of Ver.2 is prepared regardless of a weight ratio of the high-boiling point solvent and the low-boiling point solvent.

Also, when TAC is used as the substrate 11 and the solvent described above is used, a surface of the TAC may be dissolved. In this regard, adhesion between the substrate 11 and the hard coat layer 12 may further improve.

The photopolymerization initiator is a compound that is added to initiate photopolymerization. Materials for the photopolymerization initiator are not particularly limited. For example, an α-hydroxyacetophenon-based photopolymerization initiator may be used. For example, an example of the α-hydroxyacetophenon-based photopolymerization initiator may be Darocur1173 available from BASF SE. Also, Irgacure184, Irgacure2959, and Irgacure127 available from BASF SE and Esacure KIP 150 available from DKSH may be used. Also, these may be used alone or as a combination of two or more selected therefrom.

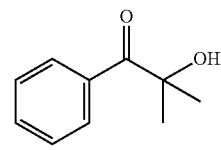

DAROCUR 1173

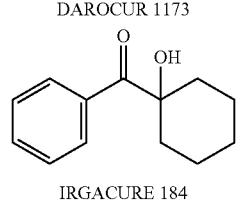

IRGACURE 184

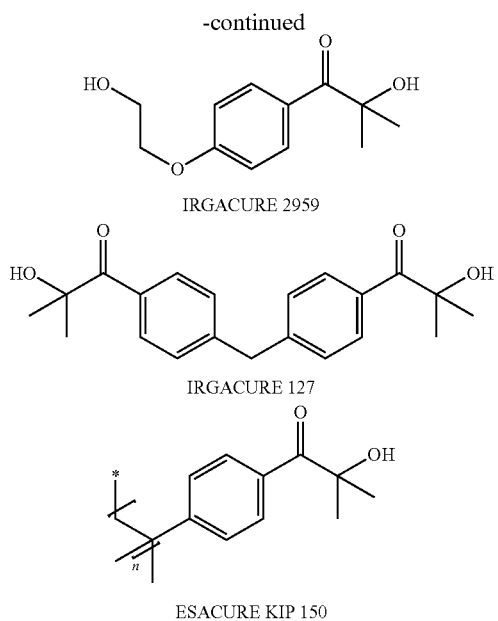

Hereinafter, a method of forming the hard coat layer 12 will be described.

Figure 6:
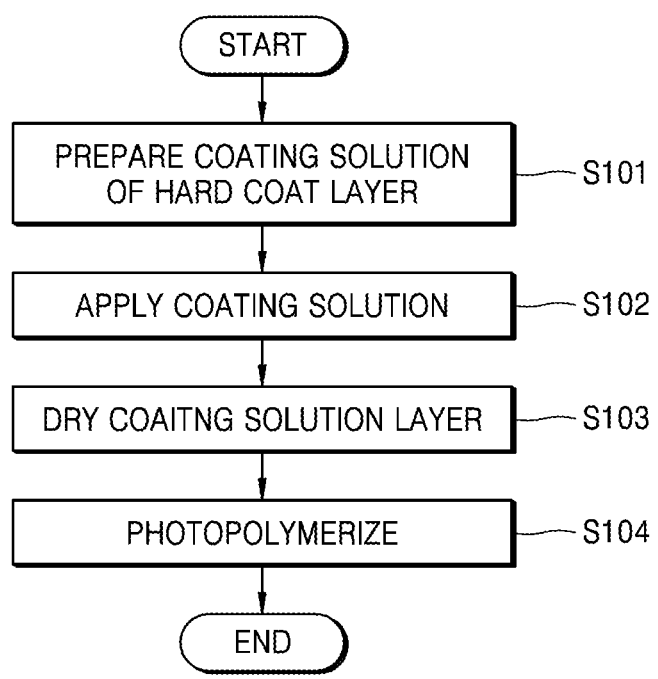
FIG. 6 is a flowchart that illustrates a method of forming a hard coat layer according to another embodiment.

FIG. 6 is a flowchart that illustrates the method of forming the hard coat layer 12 according to another aspect of an embodiment.

First, a coating solution for forming the hard coat layer 12 is prepared (S101: a coating solution preparation process). The coating solution is formed of the metal oxide particles 121, a monomer or the multibranched monomer 50 (or, a multibranched oligomer) that constitutes the binder 122, a photopolymerization initiator, and a solvent that disperses these. In order to prepare the coating solution, first, the metal oxide particles 121, the monomer or the multibranched monomer 50 (a multibranched oligomer), and the photopolymerization initiator are added to the solvent. Then, the mixture is stirred to disperse the metal oxide particles 121, the monomer, and the photopolymerization initiator in the solvent.

Here, a composition ratio of the ingredients may be controlled according the type of the hard coat layer 12 that is selected from Ver.1 to Ver. 3 shown in FIGS. 2A to 2C.

Subsequently, the substrate 11 is prepared, and the coating solution prepared in S101 is coated on the substrate 11 (S102: a coating process). Thereby, a coating layer is formed. The coating process may be performed by using, for example, a method using a wire bar.

Also, the coating layer thus prepared is dried (S103: a drying process). The drying process may be performed by leaving the coating layer to dry, by heating, or by vacuum-drying at room temperature.

Also, the monomer or multibranched monomer 50 (a multibranched oligomer) is photopolymerized by irradiating light such as UV light (S104: a photopolymerizing process). Accordingly, the first monomer, the second monomer, and the multibranched monomer 50 (a multibranched oligomer) are photopolymerized and thus cured. In this regard, the hard coat layer 12 may be formed on the substrate 11. Also, the drying process and the photopolymerizing process together may be deemed as a curing process by which the coating solution is cured to prepare the hard coat layer 12.

When this method of forming the hard coat layer 12 is used, the hard coat layer 12 of any of Ver.1 to Ver.3 shown in FIGS. 2A to 2C may be formed. Thus, the hard coat layer 12 of Ver.1 to Ver.3 may be selected according to the use of the hard coat layer 12.

Also, when the branched monomer 50 is used, a viscosity and a surface tension of the coating solution may be lowered. In this regard, convex-concave structures may not easily occur on a surface of the hard coat layer 12 due to the lowered viscosity and surface tension, and thus the hard coat layer 12 may have excellent surface smoothness. As a result, interference patterns may not easily occur on the hard coat layer 12.

Also, in the previous example, the case of controlling distribution of the metal oxide particles 121 to Ver.1 to Ver.3 shown in FIGS. 2A to 2C has been described. However, although not required for this case, some cases may require interference patterns to not easily occur. In those cases, for example, the second monomer may not be added. Also, a mixing ratio of the high-boiling point solvent and the low-boiling point solvent does not need to be considered, but only one of the high-boiling point solvent and the low-boiling point solvent may be used. Also, the solvent may be any other solvent.

Also, there are cases in which distribution of the metal oxide particles 121 needs to be controlled according to Ver.1 to Ver.3 shown in FIGS. 2A to 2C. Also, there are cases that do not require the interference patterns to not easily occur on the hard coat layer 12. In these cases, the multibranched monomer 50 (a multibranched oligomer) may not be included.

<Description of Method of Forming Low Refractive Layer>

Figure 7:
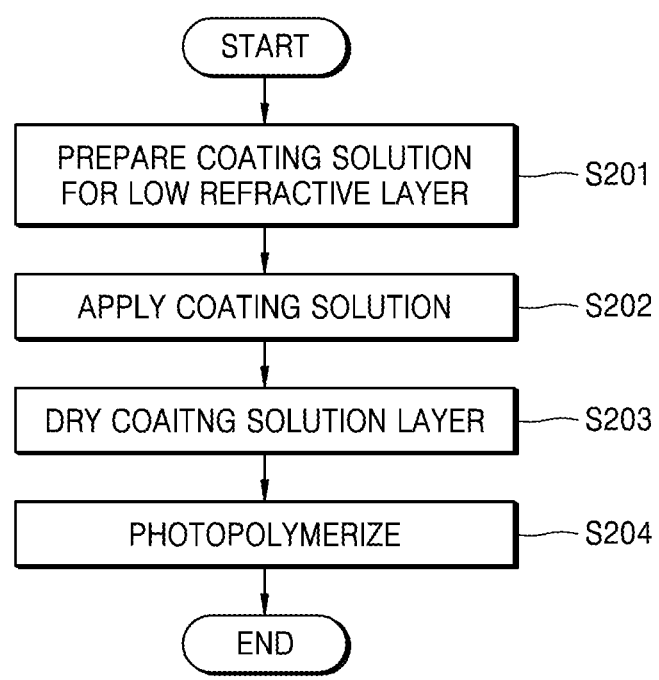
FIG. 7 is a flowchart that illustrates a method of forming a low refractive layer according to another embodiment.

FIG. 7 is a flowchart that illustrates a method of forming the low refractive layer 13 according to another aspect of an embodiment.

Also, as shown in FIG. 1B, when the protection film 10 is prepared, the hard coat layer 12 needs to be already prepared on the substrate 11. Also, as will be described later, the low refractive layer 13 is formed on the hard coat layer 12.

First, a coating solution for forming the low refractive layer 13 is prepared (S201: a coating solution preparing process). The coating solution includes the hollow silica particles 131 and a photopolymerizable fluorine-containing monomer, which are components of the low refractive layer 13. Also, the coating solution includes silsesquioxane and the modified silicone compound. Also, the coating solution includes a photopolymerization initiator. These components are used as main components. An amount of the main components is preferably 3.0 wt % or lower based on the total amount of the coating solution. Also, the coating solution includes the photopolymerizable fluorine-containing polymer as an additive.

Also, the components are added to the solvent and stirred to prepare the coating solution. An amount of the solvent may preferably be 85 wt % or higher based on the total amount of the coating solution. Also, a boiling point of the solvent may preferably be 90° C. or lower. The solvent may be, for example, methylethylketone (MEK).

Also, the coating solution prepared in S201 is coated by using a wire bar (S202: a coating process). Thus, the coating solution layer is formed.

Also, the coating solution layer thus prepared is dried (S203: a drying process). The drying process may be performed by leaving the coating solution layer to dry, by heating, or by vacuum-drying at room temperature.

Lastly, the hollow silica particles 131 and the photopolymerizable fluorine-containing monomer are photopolymerized by irradiating light such as UV light (S204: a photopolymerizing process). Thereby, the protection layer 10 may be prepared. Also, the drying process and the photopolymerizing process together may be deemed as a hardening process that hardens the coating solution to prepare the low refractive layer 13.

The low refractive layer 13 according to an embodiment includes a silsesquioxane and a modified silicone compound. In this regard, strength and scratch resistance of the low refractive layer 13 may improve. Particularly, when the low refractive layer 13 includes the modified silicone compound, an excellent slippery property of the outermost surface of the low refractive layer 13 may be maintained, and also, its cross-linking density may improve. As a result, the strength and the scratch resistance of the low refractive layer 13 may improve.

Figure 8A:
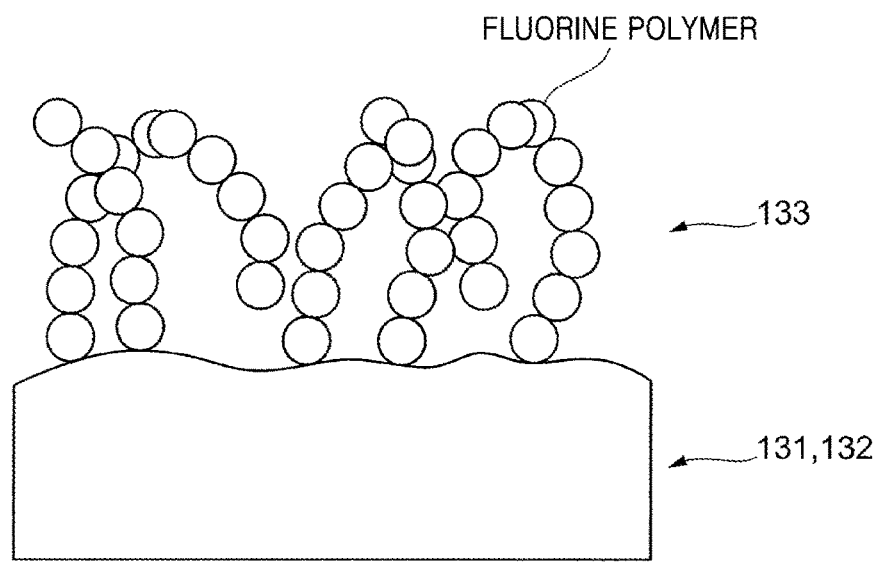
FIGS. 8A and 8B are conceptual views that illustrate a difference in fluorine polymer layers of the low refractive layers, one including modified silicon and the other not including modified silicon.
Figure 8B:
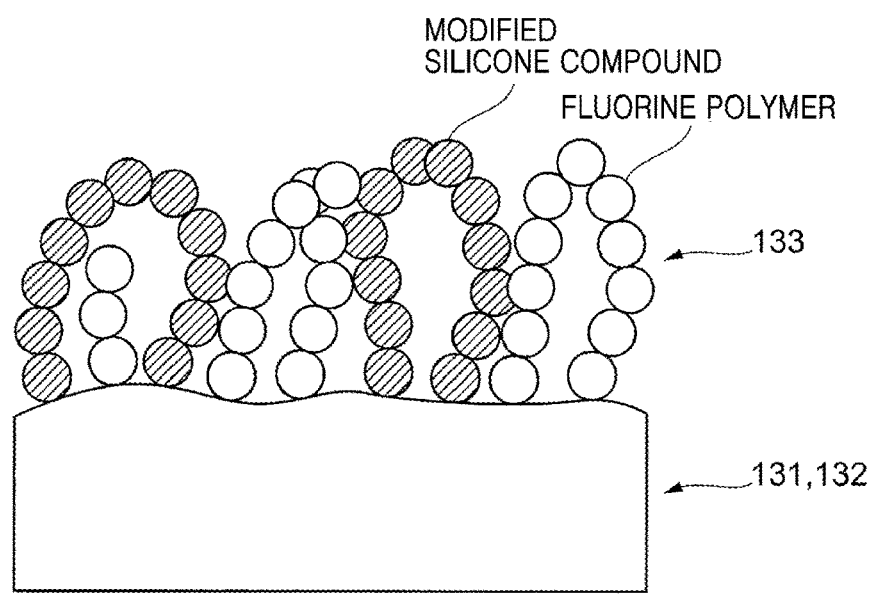

FIGS. 8A and 8B are conceptual views that illustrate a difference between the fluorine polymer layer 133 of the low refractive layer 13 including the modified silicone compound and the fluorine polymer layer 133 of the low refractive layer 13 not including the modified silicone compound.

Here, FIG. 8A is a conceptual view of the fluorine polymer layer 133 not including the modified silicone compound. When the fluorine polymer layer 133 does not include the modified silicone compound, the photopolymerizable functional group at an end of the photopolymerizable fluorine-containing polymer is photopolymerized with a photopolymerizable functional group of the binder 132. The photopolymerizable functional group at the end of the photopolymerizable fluorine-containing polymer is indicated as $RA^1$ at the end in Formula (6). Also, the photopolymerizable functional group at the end of the photopolymerizable fluorine-containing polymer is bound to a photopolymerizable functional group of the hollow silica particles 131, or is bound to a photopolymerizable functional group of the photopolymerizable fluorine-containing monomer of the binder 132. In this case, such bindings maintain the strength of the fluorine polymer layer 133. However, cross-linking points at which the photopolymerizable fluorine-containing polymer polymerizes are only at the end, and the number of these cross-linking points is very small. Therefore, strength of the fluorine polymer layer 133 may not be sufficient.

However, FIG. 8B is a conceptual view of the fluorine polymer layer 133 including the modified silicone compound. When the modified silicone compound is included, the fluorine polymer layer 133 is formed of a fluorine polymer and the modified silicone compound. In this case, the photopolymerizable fluorine-containing polymers polymerize with each other through the modified silicone compound. Therefore, the number of the cross-linking points increases, and the strength of the fluorine polymer layer 133 may easily improve.

Also, when the modified silicone compound is not included, strength of the low refractive layer 13 may not be particularly secured when the hard coat layer 12 is an antiglare (AG) type. In the AG type, the hard coat layer 12 has a convex-concave structure at a surface thereof. In this case, an antiglare effect may occur, unlike when the hard coat layer 12 is a clear type having a flat surface. Also, reflection may be suppressed. However, a surface of the hard coat layer 12 becomes rough. Thereby, strength of the low refractive layer 13 formed on the hard coat layer 12 may easily be weakened. When the low refractive layer 13 includes the modified silicone compound, strength of the low refractive layer 13 may be easily secured even when the hard coat layer 12 is the AG type. Therefore, the present embodiment may provide the low refractive layer 13 that may preferably be used irrespective of the hard coat layer 12 being the clear type or the AG type. Also, since the AG type has a convex-concave structure on a surface thereof, a surface area of the AG type is larger than that of the clear type. In this regard, a surface area of the low refractive layer 13 that is formed on the hard coat layer 12 may easily increase. Also, the amount of the fluorine polymers and modified silicone compound existing in the fluorine polymer layer 133 which is located in the surface portion of the low refractive layer 13 increases. As a result, friction of a surface of the low refractive layer 13 reduces, and thus a slippery property may improve.

Also, in the low refractive layer 13 according to an embodiment, the photopolymerizable fluorine-containing polymer is more concentrated in the surface of the low refractive layer 13. This is because the photopolymerizable fluorine-containing polymer bleeds out due to repulsion between silsesquioxane and a monomer for the photopolymerizable fluorine-containing resin. In this regard, a contact angle of the low refractive layer 13 increases, and a wetting property of the contaminant component may degrade. As a result, the contaminant component being attached on a surface of the low refractive layer 13 may be suppressed.

Also, the low refractive layer 13 according to an embodiment uses hollow silica particles having a plurality of different median particle diameters as the hollow silica particles 131. In this regard, strength of the low refractive layer 13 may further improve. However, it is not necessarily necessary to use, as the hollow silica particles 131, a combination of two or more sets of particles with each set having a median particle diameter which is different from that of other sets. That is, when the low refractive layer 13 includes silsesquioxane and the modified silicone compound, sufficient strength of the layer may be implemented. Therefore, hollow silica particles having a plurality of different median particle diameters may not be used as the hollow silica particles 131.

Also, the hollow silica particles 131 are agglomerated in the low refractive layer 13 according to an embodiment. In this regard, a sea-island structure is formed. Therefore, reflectance of the low refractive layer 13 may further decrease. Also, since a surface area of the surface of the low refractive layer 13 increases, an amount of the photopolymerizable fluorine-containing polymer existing in the surface of the low refractive layer 13 may further increase. In this regard, friction of the surface of the low refractive layer 13 is lowered, and thus a slippery property improves. This is the same in the case when the modified silicone compound is included, and in this case, the slippery property may be maintained in a further improved state.

MODE OF THE INVENTION

Example

Hereinafter, embodiments will be described in detail by referring to Examples. However, the present disclosure is not limited to Examples as long as the inventive concept is pertained to.

First, the hard coat layer 12 according to an embodiment was prepared and evaluated.

Formation of Hard Coat Layer 12

Example A2-1

In this embodiment, antimony-doped tin oxide (ATO) was used as metal oxide particles 121. Here, an ATO sol available from Nikki Shokubai Kasei Co., Ltd. and including ATO dispersed in isopropyl alcohol (IPA) at a concentration of 20.6 wt % was used. Also, 4.854 g of the ATO sol was weighed exactly. That is, ATO included in the 4.854 g ATO sol was 1.0 g. Then, 0.782 g of diacetone alcohol was added as a high-boiling point solvent and evenly mixed. Also, 14.86 g of 1,3-dioxolane was added as a low-boiling point solvent and stirred for 5 minutes. Next, 8.91 g of pentaerythritol tetraacrylate (A-TMMT) available from Shin-Nakamura Chemical Co., Ltd. was added as the first monomer. Then, 0.09 g of pentaerythritol triacrylate (A-TMM-3) was added as the second monomer. The solution was then stirred until its contents were evenly dispersed. Lastly, 0.5 g of Irgacure184 available from BASF Japan Ltd. was added as a photopolymerization initiator, and the solution was stirred. Thus, a coating solution was prepared.

Here, as shown in FIG. 9, a weight ratio of the metal oxide particles 121, i.e., ATO and a monomer formed of A-TMMT and A-TMM-3 was 10:90. A weight ratio of A-TMMT and A-TMM-3 was 99:1. A weight ratio of diacetone alcohol and 1,3-dioxolane was 5:95. A weight of the total of ATO and the monomer was 10.0 g. That is, ATO was included at an amount of 10 wt %. Also, Irgacure184 was added at an amount of 5 wt %.

Subsequently, the substrate 11 formed of TAC was prepared, and the coating solution was coated on the substrate 11 by using a wire bar to prepare a coating solution layer. Also, the coating solution layer was dried by heating the coating solution layer at 100° C. for 1 minute after leaving the coating solution layer at room temperature for 1 minute. The coating layer was then subjected to irradiation from a UV lamp (a metal halide lamp, a light quantity of 1000 mJ/cm$^2$) for 5 seconds. Thereby, the coating solution layer was cured. By following a sequence of these procedures, the hard coat layer 12 was prepared on the substrate 11. Also, in order to perform evaluation of the hard coat layer 12, the low refractive layer 13 was not prepared.

Examples A1-1 to A1-3, A2-2 to A2-7, A3-1 to A3-7, and Comparative Examples A4-1 to A4-3

As shown in FIG. 9, ATO, diacetone alcohol, 1,3-dioxolane, A-TMMT, A-TMM-3, and Irgacure184 were changed. Other than these changes, the hard coat layer 12 was prepared in the same manner as in Example A2-1.

[Evaluation Method]

For the hard coat layer 12, a surface resistance value, a pencil hardness, a refractive index, an amount of the metal oxide particles 121 at the surface, and a layer thickness were evaluated. Hereinafter, an evaluation method will be described.

(Surface Resistance Value)

The surface resistance value was measured by using UX MCP-HT800 manufactured by Mitsubishi Chemical Anarikku. This measurement was made under the measuring conditions including a temperature of 24° C. and a relative humidity of 50%.

The lower surface resistance value indicates that the hard coat layer 12 was not well charged.

(Pencil Hardness Test)

Figure 10:
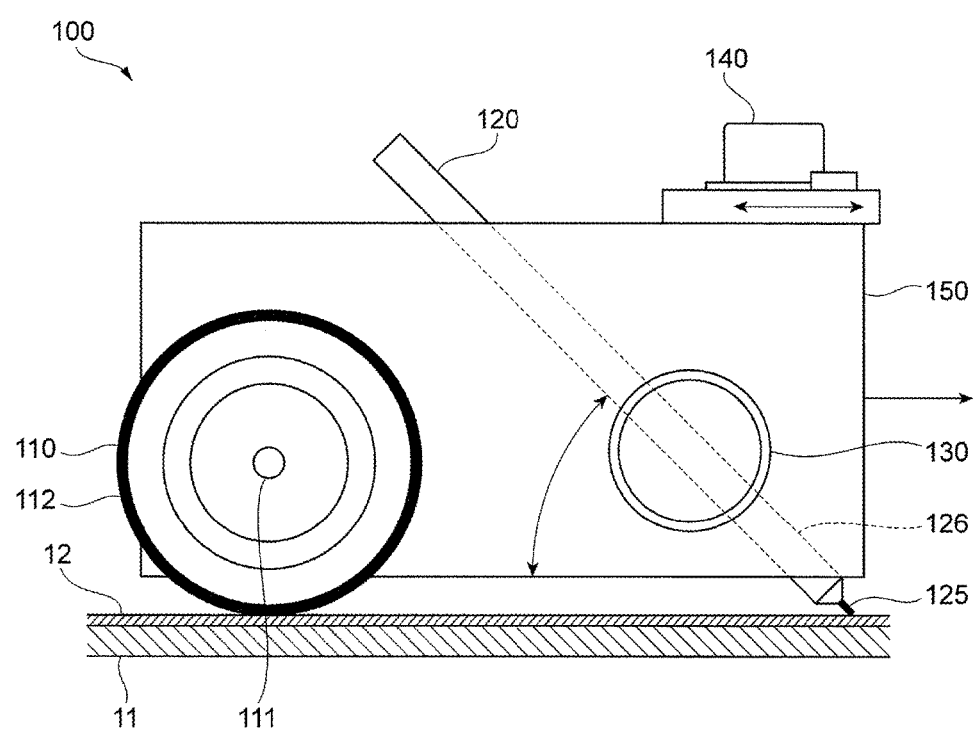
FIG. 10 is a view that illustrates a pencil hardness measuring device that measures a pencil hardness.

FIG. 10 is a view that illustrates a pencil hardness measuring device 100 for measuring a pencil hardness.

The pencil hardness measuring device 100 includes a wheel 110, a pencil 120, and a pencil linking port 130. Also, the pencil hardness measuring device 100 includes a level instrument 140 and a case 150.

The wheel 110 is located at each of two sides of the case 150. The two wheels 110 are connected by an axle 111. The axle 111 is installed in the case 150 by using a bearing that is not shown in the drawing. Also, the wheels 110 are formed of a metal material and may have a ring 112 having an O-shape on the outer circumference.

The pencil 120 is installed in the case 150 through the pencil linking port 130. The pencil 120 has a lead 125 having a predetermined hardness at a front end part. The pencil 120 is installed at an angle of 45° with respect to the substrate 11 having the hard coat layer 12 formed thereon, where the hard coat layer 12 is the subject of the test. Also, the front end part of the lead 125 contacts the substrate 11 having the hard coat layer 12. The lead 125 is controlled to be exposed at a length of 5 mm to 6 mm by cutting out a wood portion 126 of the pencil 120. Also, the front end part of the lead 125 is ground to be flattened by using sandpaper. Also, a load of 500 g is elastically pressed onto the substrate 11 having the hard coat layer 12 at the front end part of the lead 125.

In this configuration, the pencil hardness measuring device 100 may be moved by pressing the case 150. That is, when the pencil hardness measuring device 100 is pressed, the substrate 11 having the hard coat layer 12 may be moved to the left or right. Here, the wheel 110 rotates, and the lead 125 of the pencil 120 moves on the hard coat layer 12 while being tightly pressed against the hard coat layer 12.

When the pencil hardness is measured, a horizontal level is first confirmed by using the level instrument 140. Then, the lead 125 of the pencil 120 is pressed against the substrate 11 having the hard coat layer 12 thereon, and is moved to the right side of the drawing. Here, the pressing may be performed at a rate of 0.8 mm/s and to a distance of at least 7 mm. Also, scratches made on the hard coat layer 12 are observed by the naked eye. These may be sequentially performed by changing the pencil 120 and varying the hardness of the lead 125 from 6B to 6H. Also, a hardness of the lead 125 that was the greatest hardness at which no scratches were made was determined as a pencil hardness of the hard coat layer 12.

A greater pencil hardness indicates that the hard coat layer 12 is harder.

(Refractive Index)

The other whole surface of the substrate 11 which is opposite to the surface of the substrate 11 adjacent to the hard coat layer 12 was colored with a black ink. Then, surface reflectance (SCI: specular components included) was measured by using a spectrophotometer CM-2600d available from Konica Minolta Inc. Here, the measuring conditions included a measuring diameter of 8 mm, a viewing angle of 2, and a light source of D65. Also, a refractive index of the hard coat layer 12 was calculated by using the surface reflectance.

(Amount of Metal Oxide Particles at the Surface)

An amount of the metal oxide particles 121 on the surface of the hard coat layer 12 was calculated based on the refractive index of the hard coat layer 12. That is, since the refractive index of the metal oxide particles 121 and the refractive index of the binder 122 are known, the amount of the metal oxide particles 121 at the surface may be obtained by using the refractive indexes.

(Layer Thickness)

A layer thickness was measured by using spectroscopic ellipsometer SMART SE available from Horiba Co.

[Evaluation Result]

The evaluation results are shown in FIG. 9.

In FIG. 9, a surface-concentrated type (Ver.1) of FIG. 2A was referred to as "surface". Also, a dispersion type (Ver.2)

of FIG. 2B was referred to as "dispersion". Also, an interface-concentrated type (Ver.3) of FIG. 2C was referred to as "interface".

Regarding pencil hardness, the pencil hardnesses of Examples A1-1 to A1-3, A2-1 to A2-7, and A3-1 to A3-7 were H or harder, and thus, were generally preferable. However, the pencil hardness of Comparative Example A4-1 having A-TMMT and A-TMM-3 at a weight ratio of 0:100 was F. That is, the pencil hardness of Comparative Example A4-1 was inferior.

Also, in Comparative Example A4-2 having diacetone alcohol and 1,3-dioxolane at a weight ratio of 100:0 as a solvent, large interference patterns were generated. Also, appearance defects having the appearance of an orange peel occurred. Thus, an evaluation thereof was not performed. Also, Comparative Example A4-3 having diacetone alcohol and 1,3-dioxolane at a weight ratio of 0:100 as a solvent became cloudy and had surface roughness. Thus, an evaluation thereof was not performed.

As shown in FIG. 9, when a weight mixing ratio of A-TMMT, which was the first monomer, and A-TMM-3, which was the second monomer, was in a range of 99:1 to 90:10, the metal oxide particles 121 was unevenly distributed with a greater concentration in one portion. Also, when a weight ratio of the high-boiling point solvent and the low-boiling point solvent was in a range of 1:99 to 10:90, the surface-concentrated type (Ver. 1) (Examples A2-1 to A2-7) was produced. Also, when a weight ratio of the high-boiling point solvent and the low-boiling point solvent was in a range of 25:75 to 40:60, the interface-concentrated type (Ver.3) (Examples A3-1 to A3-7 and Comparative Examples A4-2 to A4-3) was produced.

When the weigh mixing ratio of the first monomer and the second monomer was outside the above range, for example, 50:50, the dispersion-type (Ver.2) (Examples A1-1 to A1-3 and Comparative Example A4-1) was produced.

When Examples A1-1 to A1-3 which became the dispersion type was compared with the other Examples, it may be known that those of Examples A1-1 to A1-3 had relatively high surface resistance values. Therefore, surface resistance values of the other Examples, which were the surface-concentrated type and the interface-concentrated type, were relatively low. That is, the results of the other Examples were better. Also, when the same amount of ATO was used, a surface resistance value of the surface-concentrated type or the interface-concentrated type was relatively lower than that of the dispersion type. In other words, an amount of ATO may be reduced when the hard coat layer 12 is the surface-concentrated type or the interface-concentrated.

Subsequently, Examples A2-1 to A2-3 having the hard coat layer 12 of the surface-concentrated type were compared with each other. When an amount of ATO increased, the surface resistance values decreased. Also, when Examples A3-1 to A3-3 having the hard coat layer 12 of the surface-concentrated type were compared to each other, the surface resistance values decreased as an amount of ATO increased.

Also, Examples A2-3 to A2-5 having the hard coat layer 12 of the surface-concentrated type were compared to each other. Regarding the weight mixing ratio of A-TMMT and A-TMM-3, when the amount of A-TMMT was increased, and the amount of A-TMM-3 was reduced, then, it was found that the surface resistance value was decreased.

Also, the results were the same when Examples A3-5 to A3-7 having the hard coat layer 12 of the interface-concentrated type were compared to each other.

Next, Examples A2-1, A2-6, and A2-7 having the hard coat layer 12 of the surface-concentrated type were compared to each other. In particular, their weight ratios of diacetone alcohol, which is a high-boiling point solvent, and 1,3-dioxolane, which is a low-boiling point solvent, were compared to each other. When the amount of diacetone alcohol was reduced and the amount of 1,3-dioxolane was increased, then, it was found that the surface resistance value was decreased.

Also, Examples A3-4 and A3-5 having the hard coat layer 12 of the interface-concentrated type were compared to each other. In this case, on the other hand, when a proportion of diacetone alcohol was increased, the surface resistance value was decreased.

Also, the hard coat layer 12 was prepared by using another method, and evaluation thereof was performed.

Formation of Hard Coat Layer 12

Example B1

In the present embodiment, ATO was used as the metal oxide particles 121. Here, an ATO sol available from Nikki Shokubai Kasei Co., Ltd. and including ATO dispersed in IPA at a concentration of 20.6 wt % was used. Also, 4.854 g of the ATO sol was weighed exactly. That is, ATO included in the 4.854 g ATO sol was 1.0 g. Then, 19.97 g of diacetone alcohol was added thereto as a high-boiling point solvent and then evenly stirred. Also, 13.31 g of 1,3-dioxolane was added thereto as a low-boiling point solvent and stirred for 5 minutes. Also, 17.60 g of A-TMMT available from Shin-Nakamura Chemical Co., Ltd. was added thereto as the first monomer. Also, 0.60 g of CN2304 available from Sartomer Co., Inc. was added thereto as the multibranched monomer 50. Also, the solution was stirred until the contents thereof were evenly dispersed. Lastly, 0.8 g of Irgacure184 available from BASF Japan Ltd. was added thereto as a photopolymerization initiator, and the solution was stirred. Thereby, preparation of a coating solution was completed.

Here, the total amount of solid in the solution was 20.00 g. In the solid, ATO was included at an amount of 5 wt %. Also, the first monomer was included at an amount of 88 wt % by using the same method, and the multibranched monomer 50 was included at an amount of 3 wt %. Also, Irgacure184 was included at an amount of 4 wt %.

Subsequently, the substrate 11 formed of TAC was prepared, and the coating solution was coated on the substrate 11 by using a wire bar to prepare a coating solution layer. The coating solution layer was then dried by heating the coating solution layer at 100° C. for 1 minute after leaving the coating layer at room temperature for 1 minute. Also, the coating solution layer was subjected to irradiation from a UV lamp (a metal halide lamp, a light quantity of 1000 mJ/cm$^2$) for 5 seconds. The coating solution layer was thus cured. By following the sequence of these procedures, the hard coat layer 12 was prepared on the substrate 11. Also, in order to perform evaluation of the hard coat layer 12, the low refractive layer 13 was not prepared.

Examples B2 to B6 and Comparative Examples B1 to B3

As shown in FIG. 11, ATO, A-TMMT, the multibranched monomer 50, diacetone alcohol, 1,3-dioxolane, and Irgacure184 were changed. Other than these, the hard coat layer 12 was prepared in the same manner as in Example B 1. Here, amounts of the multibranched monomer 50 in Examples B2 to B6 were changed with respect to that of Example B 1. The multibranched monomer 50 was not included in Comparative Examples B1 to B3.

[Evaluation Method]

A surface resistance value of the hard coat layer 12 and the maximum convex-concave difference of a surface of the hard coat layer 12 were evaluated. Hereinafter, the evaluation method thereof will be described.

(Surface Resistance Value)

A surface resistance value was measured in the same manner as described above.

(Maximum Convex-Concave Difference)

A surface reflectance of the hard coat layer 12 was measured by using a UV-Vis-NIR spectrometer UV-2600 available from Shimadzu Co. In the obtained surface reflectance spectrum, a waveform within a wavelength band of 500 nm to 600 nm was used. A maximum convex-concave difference was defined by subtracting a base value B from a top value A of the waveform. That is, A %–B %=a maximum convex-concave difference %.

When the maximum convex-concave difference was lower, fewer interference patterns occurred on the hard coat layer 12.

[Evaluation Result]

The results of evaluation are shown in FIG. 11.

Regarding the surface resistance value, a surface resistance of less than 1.01010 Ω/square is considered good. Here, the surface resistance values of Examples B1 to B6 and Comparative Examples B1 to B3 were all lower than 1.01010 Ω/square, and thus, Examples B1 to B6 and Comparative Examples B1 to B3 were all good in terms of the surface resistance.

Also, Comparative Examples B1 to B3 had a further increased maximum convex-concave difference, and Examples B1 to B6 had a further decreased maximum convex-concave difference. That is, interference patterns occurred less easily in the hard coat layers of Examples B1 to B6 than in those of Comparative Examples B1 to B3. This effect is deemed as being caused by the inclusion of the multibranched monomer 50.

Also, suppression of the interference patterns increased when the maximum convex-concave difference was less than 0.2%. This condition was satisfied in Examples B1 to B4. Therefore, a preferable amount of the multibranched monomer 50 according to an embodiment may be deemed as being in a range of 3 wt % to 10 wt % based on the solid content.

Figure 12:
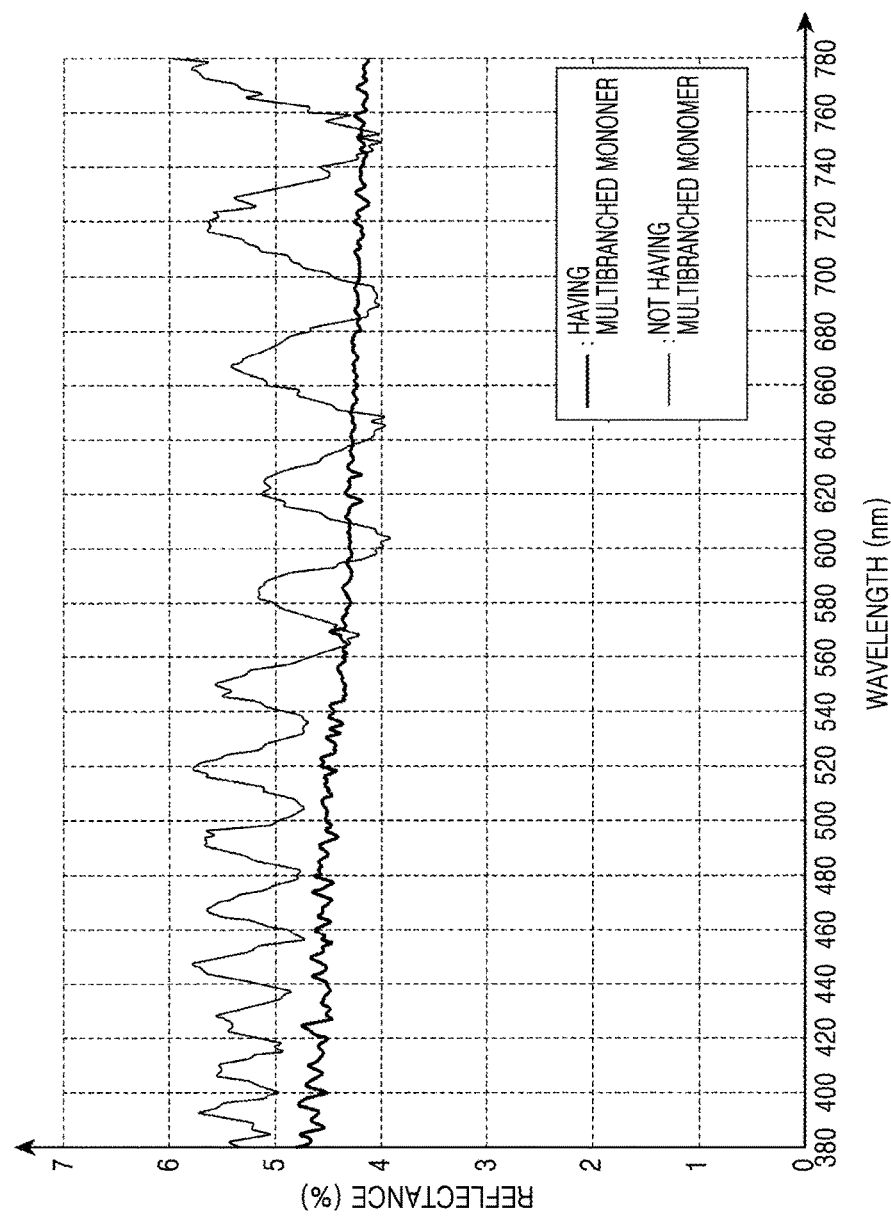
FIG. 12 is a graph showing a relationship between wavelength and reflectance in a case when a multibranched monomer is contained such that a maximum convex-concave difference is lower than 0.2% and in a case when a multibranched monomer is not contained.

FIG. 12 is a graph illustrating the relationship between wavelength and reflectance of the hard coat layers 12 including the multibranched monomer 50 so as to make the maximum convex-concave difference less than 0.2% and of the hard coat layers 12 not including the multibranched monomer 50. In FIG. 12, the horizontal axis represents wavelength, and the vertical axis represents reflectance. Also, the thick line represents when the multibranched monomer 50 was included, and the thin line represents when the multibranched monomer 50 was not included.

As shown in FIG. 12, when the multibranched monomer 50 was included, a change of reflectance according to a change of wavelength may be less. This indicates that no interference occurred in the hard coat layer 12. On the other hand, when the multibranched monomer 50 was not included, reflectance significantly increased or decreased according to a change of wavelength. This indicates that interference occurred in the hard coat layer 12, and light of a wavelength corresponding to a peak was intensified by the interference. Therefore, in this case, an interference pattern was formed on the hard coat layer 12.

Next, the low refractive layer 13 according to an embodiment was prepared, and evaluation was performed thereon.

Formation of Low Refractive Layer 13

Example C1

Two types of hollow silica particles were used as the hollow silica particles 131. That is, Surulia 4320 available from Nikki Shokubai Kasei Co., Ltd. (having a median particle diameter of 60 nm) and Surulia 2320 available from Nikki Shokubai Kasei Co., Ltd. (having a median particle diameter of 50 nm) were used. Also, 63 parts by weight of Surulia 4320 and 3 parts by weight of Surulia 2320 were used. Also, 24 parts by weight of Optool AR-110 available from Daikin Industries was used as the photopolymerizable fluorine-containing monomer. Also, 6 parts by weight of AC-SQ available from Toa Gosei, Ltd. was used as silsesquioxane. Also, 1 part by weight of Tego Rad 2700 available from Evonik Industries AG was used as a modified silicone compound. 3 part by weight of Irgacure 907 available from BASF Japan Co. was used as the photopolymerization initiator. The total amount of these main ingredients was 100 parts by weight.

Also, 5 parts by weight of KY-1203 available from Shin-Etsu Chemical Co., Ltd. was used as the photopolymerizable fluorine-containing polymer which is an additive.

These ingredients were dispersed by using MEK as a solvent. Also, an amount of the main ingredients, which are ingredients other than the photopolymerizable fluorine-containing polymer and the photopolymerization initiator, was 1.5 wt %. In this manner, a coating solution for the low refractive layer 13 was prepared.

Then, the substrate 11 formed of a methacryl resin (PMMA: polymethyl methacrylate) was prepared. Also, the coating solution was coated on the substrate 11 by using a wire bar to prepare a coating solution layer. The coating solution layer was then dried by heating the coating solution layer at 100° C. for 1 minute after leaving the coating layer at room temperature for 1 minute. Also, the coating solution layer was subjected to irradiation from a UV lamp (a metal halide lamp, a light quantity of 1000 mJ/cm$^2$) for 5 seconds under a nitrogen atmosphere (at an oxygen concentration of 500 ppm or less). Thereby, the coating solution layer was cured. By following the sequence of these procedures, the low refractive layer 13 was prepared on the substrate 11. Also, a thickness of the low refractive layer 13 prepared by following the sequence of these procedures was in a range of 90 nm to 110 nm on average. The thickness was measured by using spectroscopic ellipsometer SMART SE available from Horiba Co. An average of the thickness was a calculated average value taken from the maximum value and the minimum value. Also, in order to perform evaluation of the low refractive layer 13, the hard coat layer 12 was not prepared.

Examples C2 to C6 and Comparative Examples C1 to C6

Ingredients used to prepare the low refractive layer 13 in Example C1 were changed as shown in FIG. 13. The rest of the procedures were the same as performed in Example C1.

In Examples C2 and C3, the same ingredients used in Example C1 were used, but amounts of the ingredients were changed.

Also, in Examples C4 to C6, the hollow silica particles 131 were different from those used in Example C1. That is, Surulia 5320 available from Nikki Shokubai Kasei Co., Ltd. (having a median particle diameter of 75 nm) and Surulia 4320 available from Nikki Shokubai Kasei Co., Ltd. (having a median particle diameter of 60 nm) were used in Example C4. Also, Surulia 5320 available from Nikki Shokubai Kasei Co., Ltd. (having a median particle diameter of 75 nm) and Surulia 2320 available from Nikki Shokubai Kasei Co., Ltd. (having a median particle diameter of 50 nm) were used in Example C5. Also, only Surulia 5320 available from Nikki Shokubai Kasei Co., Ltd. (having a median particle diameter of 75 nm) was used in Example C6.

The types and amounts of the hollow silica particles 131 used in Comparative Examples C1 to C6 were the same as those used in Examples C1 to C6, respectively. But, a modified silicone compound was not used in Comparative Examples C1 to C6.

Example C7 and Comparative Example C7

The low refractive layer 13 was prepared on the hard coat layer 12 prepared in Example B1. That is, the hard coat layer 12 was prepared on TAC, and the low refractive layer 13 was prepared thereon (shown as TAC+HC in FIG. 13). Here, ingredients used in Example C7 were the same with those used in Example C6. Also, ingredients used in Comparative Example C7 were the same with those used in Comparative Example C6.

[Evaluation Method]

A y-value, minR, and SW scratch test of the low refractive layer 13 were evaluated. A method for the evaluation will be described.

(Y-Value, minR)

The other whole surface of the substrate 11 (e.g, said other surface of the substrate 11 did not have the low refractive layer 12 formed thereon) was colored with a black ink. Then, a reflectance of specular reflection (a visible light reflectance, y-value) was measured. Here, a spectrophotometer CM-2600d available from Konica Minolta Holdings, Inc. was used. Also, the measurement conditions included a measuring diameter of 8 mm, a viewing angle of 2°, and a light source of D65.

Also, change in the y-value with respect to a frequency of the light was measured, and the smallest y-value was used as minR.

When the y-value or minR is low, the low refractive layer 13 is low reflective. In the present embodiment, when the y-value (a visible light reflectance) is 0.3% or lower, the low refractive layer 13 is determined as preferable.

(SW Scratch Test)

A front end of a 1 cm² cylinder with the front end being wound with steel wool (SW) was intimately contacted with a surface of the substrate 11 having the low refractive layer 13 thereon. Also, in order to perform the scratch test, a load was applied to the SW, and, the SW was moved back and forth 10 times (a moving distance of 70 mm). Here, the moving rate was 140 mm/s. Also, the load was changed, and the occurrence of scratches was observed with the naked eye.

According to the SW scratch test, a higher value indicates that strength of the low refractive layer 13 was high.

(Surface mean roughness (Ra), maximum height (Rmax), 10-point average roughness (Rz), convex-concave average distance (Sm), and average thickness)

A surface mean roughness (Ra), a maximum height (Rmax), a 10-point average roughness (Rz), a convex-concave average distance (Sm), and an average thickness were measured.

[Evaluation Result]

The results of evaluation are shown in FIG. 13.

Also, in the SW scratch test of FIG. 13, a value to which "OK" is given indicates that scratches did not occur under a given load. A value to which "NG" is given indicates that scratches occurred under a given load.

As shown in FIG. 13, the y-value and minR of Examples C1 to C7 and Comparative Examples C1 to C7 were all relatively preferable. However, Examples C1 to C7, which used the modified silicone compound, were, in general, more preferable than those of Comparative Examples C1 to C7, which did not use the modified silicone compound. That is, it may be known that when the modified silicone compound is used, the low refractive layer 13 has a lower reflectance.

In the SW scratch test, scratches did not occur in Examples C1 to C5, which used the modified silicone compound, even when 250 g of a load was applied thereto. Also, scratches did not occur in Examples C6 and C7 even when 300 g of a load was applied thereto. In this regard, it may be known that the hollow silica particles 131 do not necessarily have to be hollow silica particles having different particle distributions. Scratches occurred in Comparative Examples C1 to C7, which did not use the modified silicone compound, only with 50 g of a load. That is, it may be known that, when silicon is used, a strength of the low refractive layer 13 increases, and thus, an anti-scratch property may improve.

Subsequently, evaluation was performed by preparing the polarizing film D according to an embodiment.

Preparation of Polarizing Film D

Example D1

The polarizing film D was prepared by inserting and bonding a resin film that has iodine compound molecules in PVA between resin films formed of TAC. Here, no air was allowed to penetrate inside. Also, the hard coat layer 12 and the low refractive layer 13 were prepared on one surface of the TAC films according to the conditions in Example B1 and Example C7.

Comparative Example D1

A polarizing film was prepared in the same manner as in Example D1 without forming the hard coat layer 12 and the low refractive layer 13.

[Evaluation Method]

A y-value, minR, and color as optical properties of the polarizing film D were evaluated. Also, an evaluation of a polarizing plate performance of the polarizing film D was performed.

The y value and minR of the polarizing film D were measured as described above. Also, the color of the polarizing film D was measured by using the same device.

The polarizing plate performance was measured as follows. First, the polarizing film D was set in the UV/Visible light spectrometer V-7100 available from Japan Spectroscopy Corporation. Then, the UV/Visible light spectrum was obtained when a straight polarizing light in a transmission axis direction was incident to the polarizing film D. Also, the UV/visible light spectrum was obtained when straight polarizing light in an absorption axis direction was incident to the polarizing film D. Then, a transmittance and a degree of polarization were obtained according to the UV/visible light spectrum.

[Evaluation Result]

The evaluation results are shown in FIG. 14.

Comparing Example D1 and Comparative Example D1, the y-value and minR as the optical properties of Example D1 were significantly decreased as compared with those of Comparative Example D1. This indicates that reflectance was significantly lowered. Also, the color of the films in Example D1 was not significantly different from that of Comparative Example D1.

Also, in terms of the polarizing plate performance, the polarizing degrees of the films of Example D1 were substantially the same as that of Comparative Example D1. Also, the total transmittance of Example D1 was higher than that of Comparative Example D1. The film of Example D1 exhibited better performance than the film of Comparative Example D1.

Then, an evaluation of a display device 1 using the polarizing film D of Example D1 was performed.

Preparation of Display Device 1

Example E1

The polarizing film D of Example D1 was mounted on the display device 1.

Comparative Example E1

The polarizing film D of Comparative Example D1 was mounted on the display device 1.

[Evaluation Method]

A y-value of the surface of the display device 1 was measured as described above. During the measurement, the display device 1 was powered-off.

[Evaluation Result]

A y-value of the display device 1 of Example E1 was 2.3%, whereas a y-value of the display device 1 of Comparative Example E1 was 6%.

That is, the display device 1 of Example E1 had low reflectivity as compared with that of the display device of Comparative Example E1, and external light reflection was suppressed. Also, when an image was displayed by operating the display device 1 of Example E1, external light reflection was reduced, and a fine image was displayed.

Although the display device 1 in the examples above had the hard coat layer 12 and the low refractive layer 13 formed on a liquid crystal panel, embodiments are not limited thereto. For example, the hard coat layer 12 and the low refractive layer 13 may be formed on an organic EL display or a Braun tube display. Also, application of the hard coat layer 12 and the low refractive layer 13 is not limited to a display device, and may be formed on a surface of a lens. In this case, the substrate 11 may serve as a main body of a lens that may be formed of glass or plastic. Also, the lens having the hard coat layer 12 and the low refractive layer 13 is an example of an optical element.

Also, although Examples had the hard coat layer 12 equipped therein, but the hard coat layer 12 does not need to be equipped when not necessary. Also, a structure of the hard coat layer 12 is not limited to that describe above, and the hard coat layer may have a different structure or may be prepared by using a different formation method.

According to another aspect of an embodiment, a resin layer includes a first binder; hollow silica particles; a polymerization product of a photopolymerizable fluorine-containing polymer; and a modified silicone compound. The first binder includes a polymer prepared by photopolymerizing a photopolymerizable fluorine-containing monomer; and a silsesquioxane. Also, the hollow silica particles are distributed in the first binder. Also, the photopolymerization product of a photopolymerizable fluorine-containing polymer, and the modified silicone compound are mainly distributed in a surface portion.

The modified silicone compound is preferably at least one selected from Formulae (1) to (3).

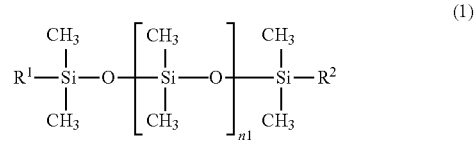

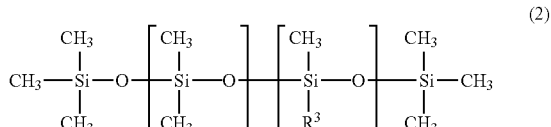

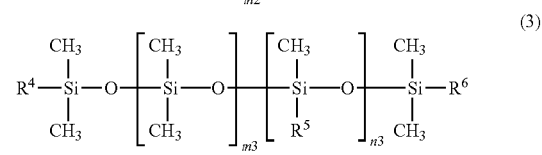

In Formulae (1) to (3), R1 to R6 are an organic group. The organic group has one selected from an amino group, a hydroxyl group, an isocyanate group, and a vinyl group at the end. Also, the organic group may have one selected from a mercapto group, a glycidoxy group, an acryloyl group, and a methacryloyl group at the end. Also, either R4 or R6 further includes a methyl group. Also, $m_2$, $m_3$, $n_1$, $n_2$, and $n_3$ are integers.

Also, in Formulae (2) and (3), $n_2$ and $n_3$ are preferably 6 or greater to 10 or less.

Here, the photopolymerizable fluorine-containing monomer may be preferably represented by Formulae (4) and (5).

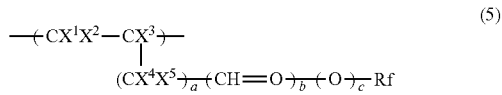

In Formula (4), the structural unit M is a structural unit that is derived from a fluorine-containing ethylene monomer represented by Formula (5). The structural unit A is a structural unit that is derived from a monomer copolymerizable with the fluorine-containing ethylene monomer which is represented by Formula (5). Also, the structural unit M may be included at an amount in a range of 0.1 mol % or higher to 100 mol % or lower, and the structural unit A may be included at an amount in a range of higher than 0 mol % to 99.9 mol % or lower. A number average molecular weight of the structural unit M is in a range of 30,000 or higher to 1,000,000 or lower.

In Formula (5), $X^1$ and $X^2$ are H or F. $X^3$ is H, F, $CH_3$, or $CF_3$. $X^4$ and $X^5$ are identical to or different from each other and are each H, F, or $CF_3$. RF is an organic group that has one to three $Y^1$ bonded to a C1-C40 fluorine-containing alkyl group or to a C2-C100 fluorine-containing alkyl group having an ether bond. $Y^1$ is a C2-C10 monovalent organic group having an ethylene carbon-carbon double bond at its end. a is 0, 1, 2, or 3, and b and c are each 0 or 1.

The photopolymerizable fluorine-containing polymer is preferably represented by Formula (6).

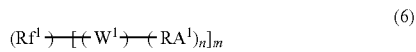
(6)

In Formula (6), $Rf^1$ represents a (per)fluoro alkyl group or a (per)fluoro polyether group. $W^1$ represents a linking group. $RA^1$ represents a functional group having a polymerizable unsaturated group. n represents an integer of 1 to 3, and m represents an integer of 1 to 3.

Here, the silsesquioxane is preferabe to include a complete cage structure.

Also, the hollow silica particles may have a plurality of relative maximum points in a frequency-particle diameter curve that represent particle distribution of the hollow silica particles.

Also, the hollow silica particles may preferably have a photopolymerizable functional group and a hydroxyl group on surfaces thereof. Also, a median particle diameter of the hollow silica particles may be preferably in a range of 10 nm to 100 nm. Also, a refractive index of the hollow silica particles themselves is preferably in a range of 1.10 to 1.40.

Also, a surface average roughness (Ra) of a surface of the resin layer may be preferably in a range of 10 nm to 20 nm.

Also, a visible light reflectance of the surface of the resin layer is preferably 0.3% or lower.

Also, an optical element according to an embodiment includes a substrate and a low refractive layer formed on the substrate. The low refractive layer includes a first binder; hollow silica particles; a polymerization product of a photopolymerizable fluorine-containing polymer; and a modified silicone compound. The first binder includes a polymer prepared by photopolymerizing a photopolymerizable fluorine-containing monomer; and a silsesquioxane. Also, the hollow silica particles are distributed in the first binder. Also, the polymerization product of a photopolymerizable fluorine-containing polymer and the modified silicone compound are mainly distributed in a surface portion.

Here, a hard coat layer is preferably included between the substrate and the low refractive layer. The hard coat layer includes a second binder and metal oxide particles. The second binder is prepared by photopolymerizing a monomer having a photopolymerizable functional group. The metal oxide particles are distributed in the second binder.

The monomer having a photopolymerizable functional group preferably includes at least one monomer selected from a first monomer and a second monomer. The first monomer is represented by Formula (7), and the second monomer is represented by Formula (8).

(7)

(8)
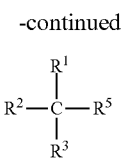

In Formulae (7) and (8), each of $R^1$ to $R^4$ represents a photopolymerizable functional group that does not include a hydroxyl group. Also, in Formula (8), $R^5$ represents a functional group having a hydroxyl group at the end.

The second binder preferably includes a multibranched monomer having a photopolymerizable functional group and/or a multibranched oligomer having a photopolymerizable functional group. Also, the second binder preferably includes a photopolymerization product of a photopolymerizable monomer having a photopolymerizable functional group.

Also, the multibranched monomer having a photopolymerizable functional group preferably binds with a photopolymerizable functional group at a branch point of the second or higher generation.

Also, the second binder may be photopolymerized in a state where the first monomer and the second monomer are mixed at a weight ratio in a range of 99:1 or greater to 90:10 or less.

Also, the metal oxide particles may be preferably formed of a tin oxide added with a conducting material.

The metal oxide particles may be unevenly distributed in the second binder with a greater concentration in a surface portion adjacent to the substrate.

Also, the substrate is preferably a transparent substrate having a total luminous transmittance of 85% or higher.

Also, the substrate is preferably formed of triacetylcellulose.

Also, an optical element according to another embodiment includes a substrate; and a low refractive layer that is formed on the substrate and has a convex-concave structure on a surface of the low refractive layer. The low refractive layer has particles having a hollow shape and a resin component as main components. Also, a maximum layer thickness of the low refractive layer is 200 nm or less, and an average thickness is in a range of 90 nm or greater to 130 nm or less. Also, the low refractive layer has a surface average roughness (Ra) in a range of 10 nm or greater to 20 nm or less and a maximum height (Rmax) in a range of 60 nm or greater to 150 nm or less. Also, the low refractive layer has a 10-point average roughness (Rz) in a range of 20 nm or greater to 60 nm or less and a convex-concave average distance (Sm) in a range of 20 nm or greater to 80 nm or less. Also, the low refractive layer has a visible light reflectance of 0.3% or lower.

Also, the optical element according to another embodiment includes a polarizing means that polarizes light; and a low refractive layer formed on the polarizing means. The low refractive layer includes a first binder, hollow silica particles, a photopolymerization product of a photopolymerizable fluorine-containing polymer; and a modified silicone compound. The first binder includes a photopolymerization product of a photopolymerizable fluorine-containing monomer; and a silsesquioxane. Also, the hollow silica particles are distributed in the first binder. Also, the photopolymerization product of a photopolymerizable fluorine-containing polymer and the modified silicone compound are mainly distributed in a surface portion.

Also, a coating solution for forming the low refractive layer according to the present embodiment includes a main component, a fluorine polymer, and a solvent. Here, the main component includes hollow silica particles, a photopolymerizable fluorine-containing monomer, a silsesquioxane, and a modified silicone compound. Also, the fluorine polymer is an additive. Also, the solvent disperses the main component and the photopolymerizable fluorine-containing polymer.

Also, the coating solution for forming the hard coat layer according to another embodiment includes a multibranched monomer having a photopolymerizable functional group, and/or a multibranched oligomer having a photopolymerizable functional group. Also, the coating solution for forming the hard coat layer includes a monomer having a photopolymerizable functional group. Also, the coating solution for forming the hard coat layer includes metal oxide particles. Also, the coating solution for forming the hard coat layer includes a solvent that disperses these components.

Also, the coating solution for forming the hard coat layer according to the present embodiment includes a monomer, metal oxide particles, and a solvent that disperses these.

The monomer has a first monomer and a second monomer as main components. The first monomer is represented by Formula (7), and the second monomer is represented by Formula (8). The solvent has, as a main component, one selected from the group of solvents that dissolves triacetylcellulose. Also, the solvent may have, as a main component, one selected from the group of solvents having a boiling point of 120° C. or higher, wherein the solvent may be mixed with water at a various ratio.

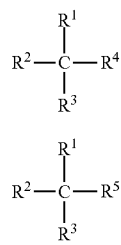

In Formulae (7) and (8), each of $R^1$ to $R^4$ represents a photopolymerizable functional group that does not include a hydroxyl group. Also, in Formula (8), $R^5$ represents a functional group having a hydroxyl group at the end.

The solvent preferably has 1,3-dioxolane and diacetone alcohol as main components.

Also, a method of forming the low refractive layer according to the present embodiment has a coating solution preparation process, a coating process, and a curing process. In the coating solution preparation process, a coating solution for forming the low refractive layer is prepared. The coating process coats the coating solution. The curing process includes a treatment of photopolymerizing a photopolymerizable fluorine-containing monomer. The curing process cures the coated coating solution, thereby forming the low refractive layer. The coating solution includes a main component, a photopolymerizable fluorine-containing polymer, and a solvent. The main component includes hollow silica particles, a photopolymerizable fluorine-containing monomer, a silsesquioxane, and a modified silicone compound. Also, the photopolymerizable fluorine-containing polymer is an additive. Also, the solvent disperses the main component and the photopolymerizable fluorine-containing polymer.

Here, the solvent may preferably have a boiling point of 90° C. or lower. Also, after coating the coating solution, the coated coating solution may be preferably dried.

Also, the method of forming the hard coat layer according to the present embodiment has a coating solution preparation process, a coating process, and a curing process. In the coating solution preparation process, a coating solution for forming the hard coat layer is prepared. The coating process coats the coating solution. The hardening process hardens the coating solution, thereby forming the hard coat layer. The coating solution includes a multibranched monomer having a photopolymerizable functional group, and/or a multibranched oligomer having a photopolymerizable functional group. Also, the coating solution includes a monomer having a photopolymerizable functional group. Also, the coating solution includes metal oxide particles. Also, the coating solution includes a solvent that disperses these. The curing process includes a treatment of photopolymerizing the multibranched monomer and/or the multibranched oligomer with a monomer having a photopolymerizable functional group.

Also, the method of forming the hard coat layer according to the present embodiment has a coating solution preparation process, a coating process, and a curing process. In the coating solution preparation process, a coating solution for forming the hard coat layer is prepared. The coating process coats the coating solution. The curing process cures the coating solution, thereby forming the hard coat layer. The coating solution includes a monomer having a first monomer and a second monomer as main components. The first monomer is represented by Formula (7), and the second monomer is represented by Formula (8).

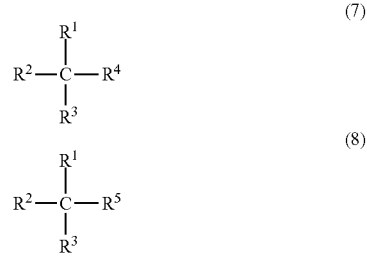

In Formulae (7) and (8), each of $R^1$ to $R^4$ represents a photopolymerizable functional group that does not include a hydroxyl group. Also, in Formula (8), $R^5$ represents a functional group having a hydroxyl group at the end.

Also, the coating solution includes metal oxide fine particles. Also, the coating solution includes a solvent that disperses these. The solvent has, as a main component, one selected from the group of solvents that dissolves triacetylcellulose. Also, the solvent may have, as a main component, one selected from the group of solvents having a boiling point of 120° C. or higher, wherein the solvent may be mixed with water at a various ratio. The curing process includes a treatment of photopolymerizing the first monomer and the second monomer.

The solvent preferably has 1,3-dioxolane and diacetone alcohol as main components.

According to another embodiment, a display device includes a display means that displays an image and a low refractive layer that is formed on a surface of the display means. The low refractive layer includes a first binder, hollow silica particles, a photopolymerization product of a photopolymerizable fluorine-containing polymer, and a modified silicone compound. The first binder includes a photopolymerization product of a photopolymerizable fluorine-containing monomer and a silsesquioxane. Also, the hollow silica particles are distributed in the first binder. Also, the photopolymerization product of a photopolymerizable fluorine-containing polymer and the modified silicone compound are mainly distributed in a surface portion.

The display means may be a liquid crystal panel.

The invention claimed is:

1. An optical element comprising
   a substrate; and
   a low refractive index layer formed on the substrate, wherein the low refractive index layer has a refractive index of 1.50 or lower,
   wherein the low refractive index layer comprises a resin layer that has a first surface and a second surface opposite to the first surface,
   wherein the first surface is a undulating surface, and the second surface is located adjacent to the substrate,
   wherein the resin layer comprises a first binder, hollow particles distributed in the first binder, and a fluorine-containing polymer immiscible with the hollow particles.

2. The optical element of claim 1, wherein the first binder further comprises a silsesquioxane.

3. The optical element of claim 1, wherein the resin layer further comprises a modified silicone compound, and a concentration of the modified silicone compound at the undulating surface is higher than a concentration of the modified silicone compound at a central part, in a thickness direction, of the resin layer.

4. The optical element of claim 1, wherein a concentration of the fluorine-containing polymer at the undulating surface is higher than a concentration of the fluorine-containing polymer at the central part, in a thickness direction, of the resin layer, the hollow particles are hollow silica particles, and the hollow particles have a plurality of relative maximum points in a frequency-particle diameter curve which exhibits particle diameter distribution of the hollow particles.

5. The optical element of claim 1, wherein the hollow particles have a photopolymerizable functional group and a hydroxyl group on a surface thereof, a median particle diameter of the hollow particles is in a range of about 10 nm to about 100 nm, and a refractive index of the hollow particles themselves is in a range of about 1.10 to about 1.40.

6. The optical element of claim 1, wherein the fluorine-containing polymer immiscible with the hollow particles is a polymer of a monomer represented by Formula (6):

(6)

wherein, in Formula (6), $Rf^1$ represents a (per)fluoroalkyl group or a (per)fluoro polyether group; $W^1$ represents a linking group; $RA^1$ represents a functional group having a polymerizable unsaturated group; n is 1, 2, or 3; and m is 1, 2, or 3.

7. The optical element of claim 1, wherein the first binder is a polymer formed of a photopolymerizable fluorine-containing monomer represented by Formulae (4) and (5):

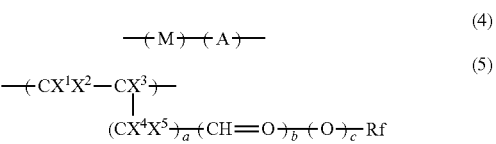

wherein, in Formula (4), M is a structural unit derived from a fluorine-containing ethylene monomer represented by Formula (5), and A is a structural unit derived from a monomer which is co-polymerizable with the fluorine-containing ethylene monomer represented by Formula (5);

in Formula (5), $X^1$ and $X^2$ are H or F; $X^3$ is H, F, $CH_3$, or $CF_3$; $X^4$ and $X^5$ are H, F, or $CF_3$; at least one of $X^1$, $X^2$, and $X^3$ comprises fluorine; Rf is an organic group having 1 to 3 $Y^1$ groups which are attached to a C1-C40 fluorine-containing alkyl group or a C2-C100 fluorine-containing alkyl group having an ether bond, wherein $Y^1$ is a C2-C10 monovalent organic group having an ethylene carbon-carbon double bond at an end thereof; a is 0, 1, 2, or 3; and b and c are 0 or 1;

the polymer comprises M at an amount in a range of about 0.1 mol % or higher to about 100 mol % or lower; and A at an amount in a range of about 0 mol % or higher to about 99.9 mol %, and a number average molecular weight of the polymer is in a range of about 30,000 to about 1,000,000.

8. The optical element of claim 1 further comprising a hard coat layer located between the substrate and the low refractive index layer, the hard coat layer comprising a second binder that is a polymer of a monomer having a photopolymerizable functional group, and metal oxide particles distributed in the second binder.

9. The optical element of claim 8, wherein the monomer having the photopolymerizable functional group comprises a first monomer represented by Formula (7) and a second monomer represented by Formula (8):

(7)

(8)

wherein, in Formulae (7) and (8), $R^1$ to $R^4$ each represent a photopolymerizable functional group that does not comprise a hydroxyl group, and $R^5$ in Formula (8) represents a functional group having a hydroxyl group at an end thereof.

10. The optical element of claim 8, wherein the second binder comprises a photopolymerization product formed by photopolymerizing: at least one selected from a multi-branched oligomer having a photopolymerizable functional group and a multibranched monomer having a photopolymerizable functional group; and the monomer having the photopolymerizable functional group.

11. The optical element of claim 8, wherein the metal oxide particles comprise a tin oxide and a conducting material added to the tin oxide.

12. The optical element of claim 8, wherein the metal oxide particles are unevenly distributed in the second binder with a greater concentration toward the second binder's surface portion adjacent to the substrate.

13. The optical element of claim 1, wherein the low refractive index layer has a maximum thickness of about 200 nm, an average thickness in a range of about 90 nm to about 130 nm, an average surface roughness (Ra) in a range of about 10 nm to about 20 nm, a maximum height (Rmax) in a range of about 60 nm to about 150 nm, a 10-point average roughness (Rz) in a range of about 20 nm to about 60 nm, an average distance between adjacent peaks of the undulating surface (Sm) in a range of about 20 nm to about 80 nm, and visible light reflectance of about 0.3% or lower.

14. The optical element of claim 1, wherein the substrate is a polarizing means.

15. An image display device comprising
an image display means; and
the an optical element disposed on a surface of the image display means,
wherein the optical element comprising
a substrate; and
a low refractive index layer formed on the substrate, wherein the low refractive index layer has a refractive index of 1.50 or lower,
wherein the low refractive index layer comprises a resin layer that has a first surface and a second surface opposite to the first surface,
the first surface is a undulating surface, and the second surface is located adjacent to the substrate, and
the resin layer comprises a first binder, hollow particles distributed in the first binder, and a fluorine-containing polymer immiscible with the hollow particles.

16. The image display device of claim 15, wherein the first binder further comprises a silsesquioxane.

17. The image display device of claim 15, wherein the resin layer further comprises a modified silicone compound, and a concentration of the modified silicone compound at the undulating surface is higher than a concentration of the modified silicone compound at a central part, in a thickness direction, of the resin layer.

18. The image display device of claim 15, wherein a concentration of the fluorine-containing polymer at the undulating surface is higher than a concentration of the fluorine-containing polymer at the central part, in a thickness direction, of the resin layer, the hollow particles are hollow silica particles, and the hollow particles have a plurality of relative maximum points in a frequency-particle diameter curve which exhibits particle diameter distribution of the hollow particles.

19. The image display device of claim 15, wherein the hollow particles have a photopolymerizable functional group and a hydroxyl group on a surface thereof, a median particle diameter of the hollow particles is in a range of about 10 nm to about 100 nm, and a refractive index of the hollow particles themselves is in a range of about 1.10 to about 1.40.

20. The image display device of claim 15, wherein the fluorine-containing polymer immiscible with the hollow particles is a polymer of a monomer represented by Formula (6):

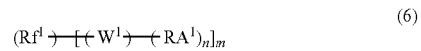

(6)

wherein, in Formula (6), $Rf^1$ represents a (per)fluoroalkyl group or a (per)fluoro polyether group; $W^1$ represents a linking group; $RA^1$ represents a functional group having a polymerizable unsaturated group; n is 1, 2, or 3; and m is 1, 2, or 3.

* * * * *